US011330255B2

(12) United States Patent
Kim et al.

(10) Patent No.: US 11,330,255 B2
(45) Date of Patent: May 10, 2022

(54) IMAGE DECODING METHOD AND APPARATUS RELYING ON INTRA PREDICTION IN IMAGE CODING SYSTEM

(71) Applicant: LG ELECTRONICS INC., Seoul (KR)

(72) Inventors: Seunghwan Kim, Seoul (KR); Sunmi Yoo, Seoul (KR); Ling Li, Seoul (KR); Jaehyun Lim, Seoul (KR); Jangwon Choi, Seoul (KR); Jungah Choi, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/953,519

(22) Filed: Nov. 20, 2020

(65) Prior Publication Data

US 2021/0076027 A1    Mar. 11, 2021

Related U.S. Application Data

(63) Continuation of application No. 16/508,658, filed on Jul. 11, 2019, now Pat. No. 10,880,544.

(Continued)

(51) Int. Cl.
*H04N 19/105* (2014.01)
*H04N 19/159* (2014.01)
(Continued)

(52) U.S. Cl.
CPC ........... *H04N 19/105* (2014.11); *H04N 19/11* (2014.11); *H04N 19/159* (2014.11); *H04N 19/176* (2014.11); *H04N 19/46* (2014.11)

(58) Field of Classification Search
CPC .. H04N 19/105; H04N 19/176; H04N 19/159; H04N 19/46; H04N 19/11;
(Continued)

(56) References Cited

U.S. PATENT DOCUMENTS

2015/0264348 A1*  9/2015  Zou .................. H04N 19/593
                                                        375/240.02
2017/0078695 A1*  3/2017  Guo .................. H04N 19/176
(Continued)

FOREIGN PATENT DOCUMENTS

CA      3104981 A1    1/2020
EP      3691264 A1    8/2020
(Continued)

OTHER PUBLICATIONS

M.G. Sarwer et al., "CE3-related: Intra mode coding", Joint Video Experts Team (JVET) of ITU-T SG 16 WP 3 and ISO/IEC JTC 1/SC29/WG 11, Jul. 10-18, 2018, JVET-K0243-v2, XP030199431 (Year: 2018).*

(Continued)

*Primary Examiner* — Dramos Kalapodas
(74) *Attorney, Agent, or Firm* — Dentons US LLP

(57) ABSTRACT

According to the present disclosure, a video decoding method performed by a video decoding device includes parsing remaining intra prediction mode information for a current block, deriving neighboring samples of the current block, deriving MPM list including MPM candidates of the current block, deriving an intra prediction mode of the current block based on the remaining intra prediction mode information, wherein the intra prediction mode is one of remaining intra prediction modes excluding the MPM candidates, deriving a prediction sample of the current block based on the intra prediction mode and the neighboring samples, and deriving a reconstructed picture based on the prediction sample, wherein the remaining intra prediction mode information is coded through a truncated binary (TB) binarization process, and wherein a binarization parameter for the TB binarization process is 60.

13 Claims, 18 Drawing Sheets

Related U.S. Application Data

(60) Provisional application No. 62/698,113, filed on Jul. 14, 2018.

(51) Int. Cl.
*H04N 19/11* (2014.01)
*H04N 19/176* (2014.01)
*H04N 19/46* (2014.01)

(58) Field of Classification Search
CPC ........ H04N 19/70; H04N 19/91; H04N 19/13; H04N 19/463; H04N 19/593; H04N 19/132
See application file for complete search history.

(56) References Cited

U.S. PATENT DOCUMENTS

| | | | |
|---|---|---|---|
| 2017/0171560 A1 | 6/2017 | Kim | H04N 19/176 |
| 2017/0272745 A1 | 9/2017 | Liu | H04N 19/463 |
| 2017/0332084 A1 | 11/2017 | Seregin et al. | |
| 2018/0199040 A1 | 7/2018 | Lee | H04N 19/593 |
| 2018/0316913 A1 | 11/2018 | Jun | H04N 19/44 |
| 2019/0273919 A1* | 9/2019 | Lim | H04N 19/159 |
| 2019/0387222 A1* | 12/2019 | Kim | H04N 19/11 |
| 2020/0007879 A1 | 1/2020 | Jiang | H04N 19/44 |
| 2020/0051288 A1 | 2/2020 | Lim | H04N 19/105 |

FOREIGN PATENT DOCUMENTS

| | | |
|---|---|---|
| EP | 3799690 A1 | 4/2021 |
| KR | 10-2016-0085908 | 7/2016 |
| KR | 10-2017-0131329 | 11/2017 |
| KR | 10-2018-0040319 | 4/2018 |
| WO | 2017204427 A1 | 11/2017 |
| WO | 2017205703 A1 | 11/2017 |
| WO | WO-2017205703 A1 * | 11/2017 ........... G01B 11/002 |
| WO | 2018056701 A1 | 3/2018 |
| WO | 2018064956 A1 | 4/2018 |
| WO | WO-2018064956 A1 * | 4/2018 ........... H04N 19/186 |
| WO | 2020013911 A1 | 1/2020 |
| WO | WO-2020013911 A1 * | 1/2020 ............ H04N 19/13 |

OTHER PUBLICATIONS

Wikipedia;"Truncated binary encoding—Wikipedia", Mar. 12, 2018, XP055805740 (Year: 2018).*

M.G. Sarwer et al., "CE3-related: Intra mode coding", Joint Video Experts Team (JVET) of ITU-T SG 16 WP 3 and ISO/IEC JTC 1/SC 29/WG 11, Jul. 10-18, 2018, JVET-K0243-V2, XP030199431.

Anonymous: "Truncated binary encoding—Wikipedia", Mar. 12, 2018, XP055805740.

JVET-J0024: buJoint Video Exploration Team (JVET) of ITU-T SG 16 WP 3 and ISO/IEC JTC 1/SC 29/WG11 10th Meeting: San Diego, US, Apr. 10-20, 2018 pp. 1-120.

Wang et al., "Novel Adaptive Algorithm for Intra Prediction With Compromised Modes Skipping and Signalling Process in HEVC"; Circuits and Systems for Video Technology, vol. 23, 2013 (Year: 2013) (Year: 2013).

Wang et al., "Novel Adaptive Algorithm for Intra Prediction With Compromised Modes Skipping and Signalling Process in HEVC"; Circuits and Systems for Video Technology, vol. 23, 2013 (Year: 2013).

No. 10 Oct. 2013.

Anand Meher Kotra et al., "CE3 3.2.3: Intra mode signaling without non-MPM list", Joint Video Experts Team (JVET) of ITU-T SG 16 WP 3 and ISO/IEC JTC 1/SC 29/WG 11, Jul. 10-18, 2018, JVET-K0368-rl.

* cited by examiner

IMAGE DECODING METHOD AND APPARATUS RELYING ON INTRA PREDICTION IN IMAGE CODING SYSTEM

CROSS-REFERENCE TO RELATED APPLICATIONS

This application is a Continuation of U.S. application Ser. No. 16/508,658, filed Jul. 11, 2019, which claims the benefit U.S. Provisional Application No. 62/698,113, filed Jul. 14, 2018. The entire contents of all of the above applications are hereby incorporated by reference.

FIELD OF THE DISCLOSURE

The present disclosure relates to a technique for image coding and, more particularly, to a method and apparatus for decoding an image using intra prediction related information in an image coding system.

RELATED ART

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present disclosure provides a method and apparatus for improving image coding efficiency.

The present disclosure also provides a method and apparatus for coding information that represents an intra-prediction mode of a current block.

The present disclosure also provides a method and apparatus for coding information that represents an intra-prediction mode of a current block among the remaining intra-prediction modes except MPM candidates.

In an embodiment of the present disclosure, a video decoding method performed by a video decoding device is provided. The method includes parsing remaining intra prediction mode information for a current block, deriving neighboring samples of the current block, deriving MPM list including MPM candidates of the current block, deriving an intra prediction mode of the current block based on the remaining intra prediction mode information, wherein the intra prediction mode is one of remaining intra prediction modes excluding the MPM candidates, deriving a prediction sample of the current block based on the intra prediction mode and the neighboring samples, and deriving a reconstructed picture based on the prediction sample, wherein the remaining intra prediction mode information is coded through a truncated binary (TB) binarization process, and wherein a binarization parameter for the TB binarization process is 60.

In another embodiment of the present disclosure, a decoding device performing an image decoding is provided. The decoding device includes an entropy decoder for parsing remaining intra prediction mode information for a current block, and a predictor for deriving neighboring samples of the current block, deriving MPM list including MPM candidates of the current block, deriving an intra prediction mode of the current block based on the remaining intra prediction mode information, wherein the intra prediction mode is one of remaining intra prediction modes excluding the MPM candidates, deriving a prediction sample of the current block based on the intra prediction mode and the neighboring samples, and deriving a reconstructed picture based on the prediction sample, wherein the remaining intra prediction mode information is coded through a truncated binary (TB) binarization process, and wherein a binarization parameter for the TB binarization process is 60.

In still another embodiment of the present disclosure, a video encoding method performed by a video encoding device is provided. The method includes deriving neighboring samples of the current block, deriving most probable mode (MPM) list including MPM candidates of the current block, determining an intra prediction mode of the current block, wherein the intra prediction mode is one of remaining intra prediction modes excluding the MPM candidates, generating a prediction sample of the current block based on the intra prediction mode and the neighboring samples, and encoding image information including remaining intra prediction mode information for the current block, wherein the remaining intra prediction mode information represents the intra prediction mode of the current block, wherein the remaining intra prediction mode information is coded through a truncated binary (TB) binarization process, and wherein a binarization parameter for the TB binarization process is 60.

In still another embodiment of the present disclosure, a video encoding device is provided. The encoding device includes a predictor for deriving neighboring samples of the current block, deriving most probable mode (MPM) list including MPM candidates of the current block, determining an intra prediction mode of the current block, wherein the intra prediction mode is one of remaining intra prediction modes excluding the MPM candidates, generating a prediction sample of the current block based on the intra prediction mode and the neighboring samples, and an entropy encoder for encoding image information including remaining intra prediction mode information for the current block, wherein the remaining intra prediction mode information represents the intra prediction mode of the current block, wherein the remaining intra prediction mode information is coded through a truncated binary (TB) binarization process, and wherein a binarization parameter for the TB binarization process is 60.

According to the present disclosure, information representing an intra-prediction of a current block may be coded based on a truncated binary code which is a variable binary code, and through this, signaling overhead of the information for representing an intra-prediction mode may be reduced, and overall coding efficiency can be improved.

In addition, according to the present disclosure, an intra-prediction mode of which selection probability is high may be represented by information of a value corresponding to a binary code of a small bit, and through this, signaling overhead of intra-prediction information may be reduced, and overall coding efficiency can be improved.

DESCRIPTION OF EXEMPLARY EMBODIMENTS

Figure 1:
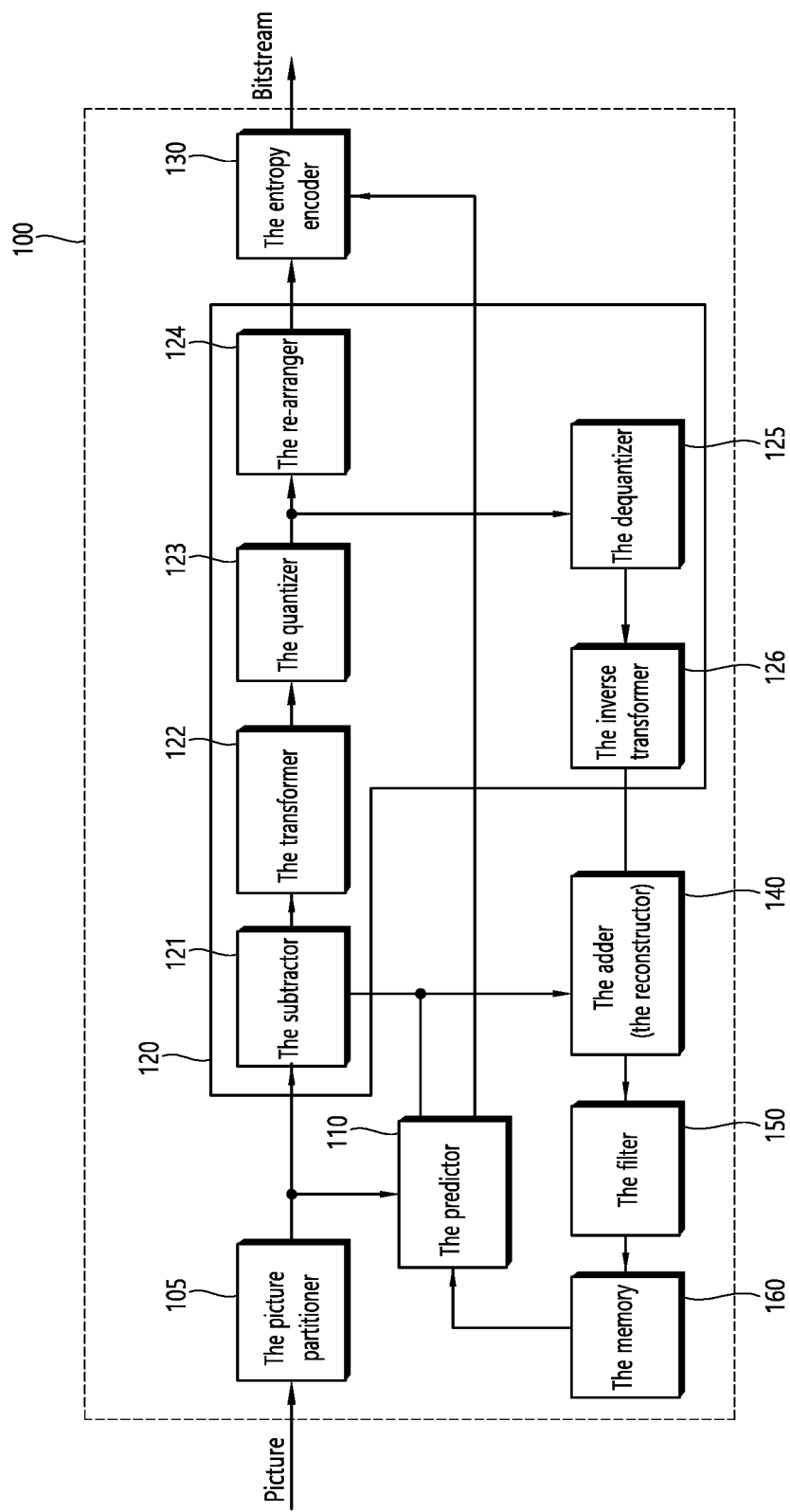
FIG. 1 is a schematic diagram illustrating a configuration of a video encoding device to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Meanwhile, the present disclosure relates to video/image coding. For example, the method/embodiment disclosed in the present disclosure may be applied to a method disclosed in versatile video coding (VVC) standard, essential Video Coding (EVC) standard, AOMedia Video 1 (AV1) standard, 2nd generation of audio video coding standard (AVS2) or next generation video/image coding standard (e.g., H.267, H.268, etc.).

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present disclosure is applicable.

Referring to FIG. 1, a video encoding device 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples can be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
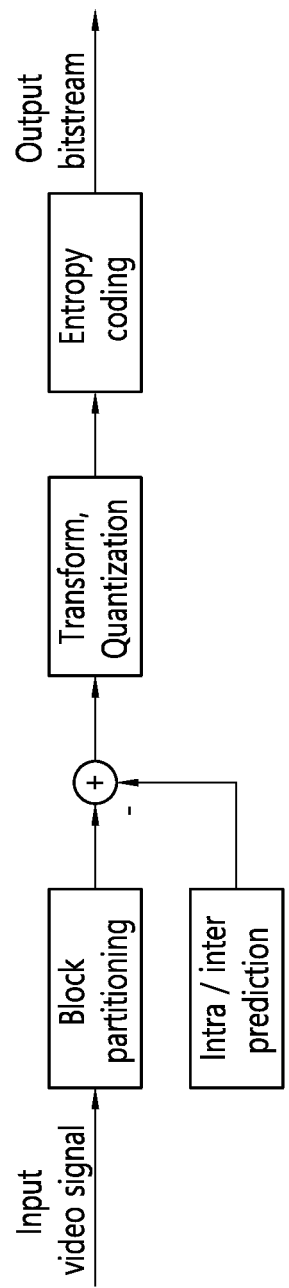
FIG. 2 illustrates an example of an image encoding method performed by a video encoding device.

FIG. 2 illustrates an example of an image encoding method performed by a video encoding device. Referring to FIG. 2, the image encoding method may include the process of block partitioning, intra/inter prediction, transform, quantization and entropy encoding. For example, a current picture may be partitioned into a plurality of blocks, a prediction block of the current block may be generated through the intra/inter prediction, and a residual block of the current block may be generated through a subtraction between an input block of the current block and the prediction block. Later, through a transform for the residual block, a coefficient block, that is, transform coefficients of the current block may be generated. The transform coefficients may be quantized and entropy-encoded and stored in a bitstream.

Figure 3:
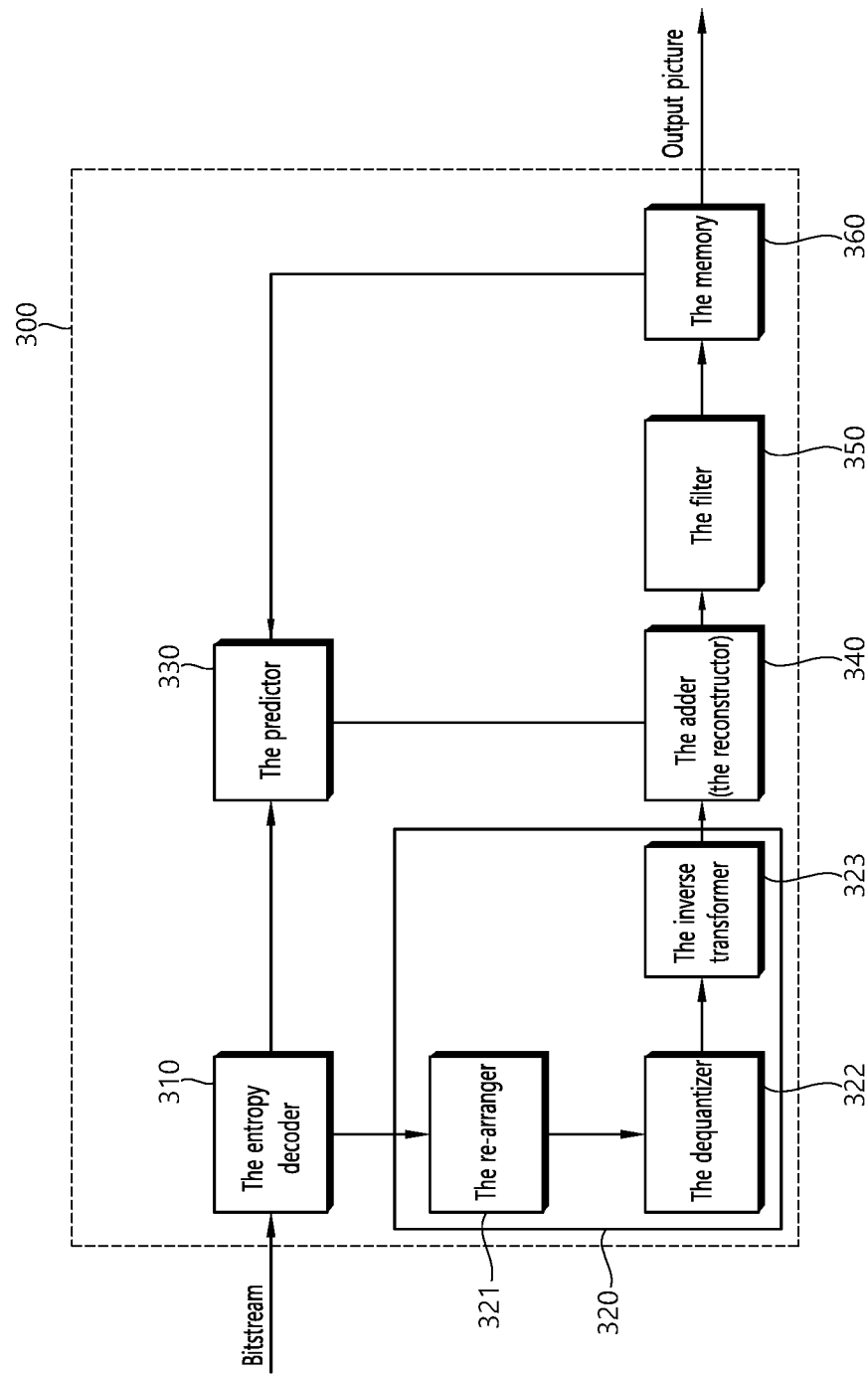
FIG. 3 is a schematic diagram illustrating a configuration of a video decoding device to which the present disclosure is applicable.

FIG. 3 briefly illustrates a structure of a video decoding device to which the present disclosure is applicable.

Referring to FIG. 3, a video decoding device 300 may include an entropy decoder 310, a residual processor 320, a predictor 330, an adder 340, a filter 350, and a memory 360. The residual processor 320 may include a re-arranger 321, a dequantizer 322, an inverse transformer 323.

When a bitstream including video information is input, the video decoding device 300 may reconstruct a video in association with a process by which video information is processed in the video encoding device.

For example, the video decoding device 300 may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 310 may parse the bitstream to output information required for video reconstruction or picture reconstruction. For example, the entropy decoder 310 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 310 may be provided to the predictor 330 and residual values, that is, quantized transform coefficients, on which entropy decoding has been performed by the entropy decoder 310 may be input to the re-arranger 321.

The re-arranger 321 may rearrange the quantized transform coefficients into a two-dimensional block form. The re-arranger 321 may perform rearrangement corresponding to coefficient scanning performed by the encoding device. Although the re-arranger 321 is described as a separate component, the re-arranger 321 may be a part of the dequantizer 322.

The dequantizer 322 may de-quantize the quantized transform coefficients based on a (de)quantization parameter to output a transform coefficient. In this case, information for deriving a quantization parameter may be signaled from the encoding device.

The inverse transformer 323 may inverse-transform the transform coefficients to derive residual samples.

The predictor 330 may perform prediction on a current block, and may generate a predicted block including prediction samples for the current block. A unit of prediction performed in the predictor 330 may be a coding block or may be a transform block or may be a prediction block.

The predictor 330 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 330 may derive a prediction sample for a current block based on a neighboring reference sample in a current picture. The predictor 330 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 330 may derive a prediction sample for a current block based on a sample specified in a reference picture according to a motion vector. The predictor 330 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 330 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 330 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 330 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 330 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 340 can add a residual sample to a prediction sample to reconstruct a current block or a current picture. The adder 340 may reconstruct the current picture by adding the residual sample to the prediction sample in units of a block. When the skip mode is applied, a residual is not transmitted and thus the prediction sample may become a reconstructed sample. Although the adder 340 is described as a separate component, the adder 340 may be a part of the predictor 330. Meanwhile, the adder 340 may be referred to as a reconstructor or reconstructed block generator.

The filter 350 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 360 may store a reconstructed picture (decoded picture) or information necessary for decoding. Here, the reconstructed picture may be the reconstructed picture filtered by the filter 350. For example, the memory 360 may store pictures used for inter-prediction. Here, the pictures used for inter-prediction may be designated according to a reference picture set or a reference picture list. A reconstructed picture may be used as a reference picture for other pictures. The memory 360 may output reconstructed pictures in an output order.

Figure 4:
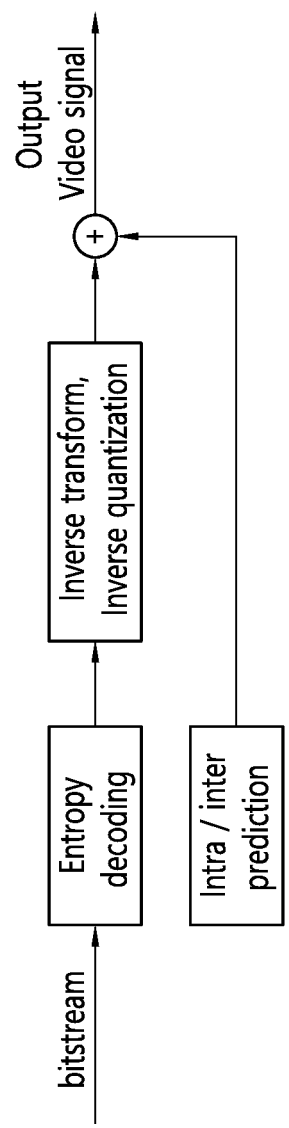
FIG. 4 illustrates an example of an image decoding method performed by a decoding device.

FIG. 4 illustrates an example of an image decoding method performed by a decoding device. Referring to FIG. 4, the image decoding method may include process of entropy decoding, inverse quantization, inverse transform and intra/inter prediction. For example, an inverse process of the encoding method may be performed in the decoding device. Particularly, through the entropy decoding for a bitstream, quantized transform coefficients may be obtained, and through the inverse quantization process for the quantized transform coefficients, a coefficient block of a current block, that is, transform coefficients may be obtained. Through the inverse transform for the transform coefficients, a residual block of the current block may be derived, and through summation between a prediction block of the current block derived through the intra/inter prediction and the residual block, a reconstructed block of the current block may be derived.

Meanwhile, in the case that the intra prediction is performed as described above, a correlation between samples may be used, and a difference between an original block and a prediction block, that is, a residual may be obtained. Since the transform and the quantization may be applied to the residual, through this, spatial redundancy may be removed. Particularly, the encoding method and the decoding method to which the intra prediction is used may be described below.

Figure 5:
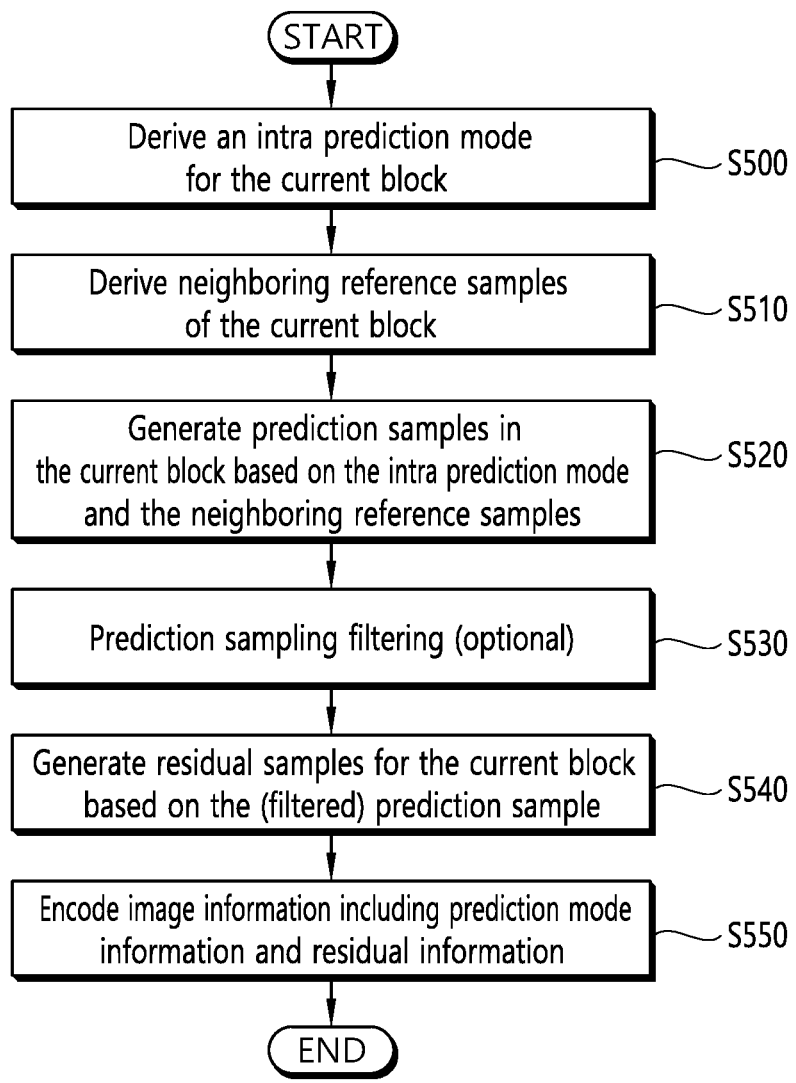
FIG. 5 illustrates an example of an image encoding method based on intra prediction.

FIG. 5 illustrates an example of an image encoding method based on intra prediction. Referring to FIG. 5, the encoding device may derive an intra prediction mode for the current block (step, S500) and derive neighboring reference samples of the current block (step, S510). The encoding device may generate prediction samples in the current block based on the intra prediction mode and the neighboring reference samples (step, S520). In this case, the encoding device may perform a prediction sample filtering procedure (step, S530). The prediction sample filtering may be called a post filtering. By the prediction sample filtering procedure, a part or the whole of the prediction samples may be filtered. According to a situation, step S530 may be omitted.

The encoding device may generate residual samples for the current block based on the (filtered) prediction sample (step, S540). The encoding device may encode image information including prediction mode information representing the intra prediction mode and residual information for the residual samples (step, S550). The encoded image information may be output in a bitstream format. The output bitstream may be transferred to the decoding device through a storage medium or a network.

Figure 6:
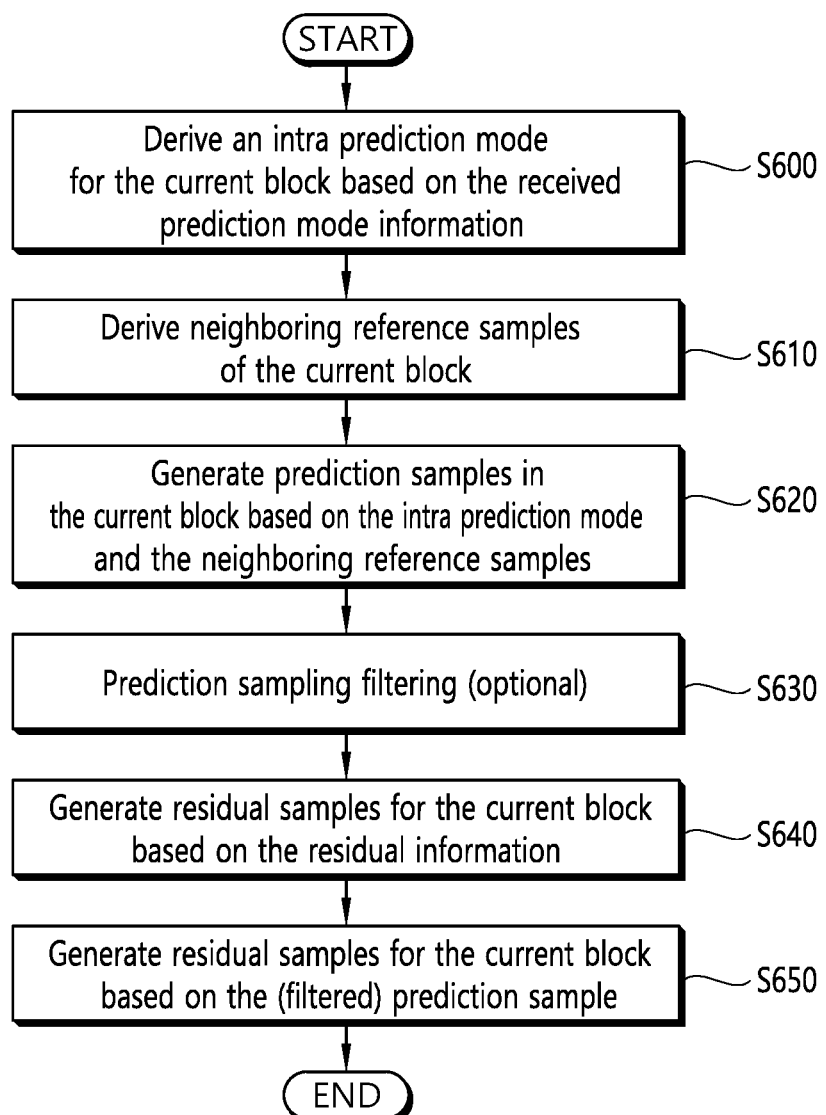
FIG. 6 illustrates an example of an image decoding method based on intra prediction.

FIG. 6 illustrates an example of an image decoding method based on intra prediction. Referring to FIG. 6, the decoding device may perform an operation that corresponds to the operation performed in the encoding device. For example, the decoding device may derive an intra prediction mode for the current block based on the received prediction mode information (step, S600). The decoding device may derive neighboring reference samples of the current block (step, S610). The decoding device may generate prediction samples in the current block based on the intra prediction mode and the neighboring reference samples (step, S620). In this case, the decoding device may perform prediction sample filtering procedure (step, S630). By the prediction sample filtering procedure, a part or the whole of the prediction samples may be filtered. According to a situation, step S630 may be omitted.

The decoding device may generate residual samples for the current block based on the received residual information (step, S640). The decoding device may generate reconstructed samples for the current block based on the (filtered) prediction samples and the residual samples, and based on it, generate a reconstructed picture (step, S650).

Meanwhile, in the case that the intra prediction is applied to the current block, as described above, the encoding device/decoding device may derive an intra prediction mode for the current block and derive a prediction sample of the current block based on the intra prediction mode. That is, the encoding device/decoding device may apply directional mode or non-directional mode based on the neighboring reference sample of the current block and derive the prediction sample of the current block.

For reference, for example, the intra prediction mode may include two non-directional or non-angular intra prediction modes and 65 directional or angular intra prediction modes. The non-directional intra prediction modes may include #0 planar intra prediction mode and #1 DC intra prediction mode, and the directional intra prediction modes may include 65 intra prediction modes from #2 to #66. However, this is just an example, but the present disclosure may be applied to a case in which the number of intra prediction modes is different. Meanwhile, according to a situation, #67 intra prediction mode may be further used, and the #67 intra prediction mode may represent a linear model (LM) mode.

Figure 7:
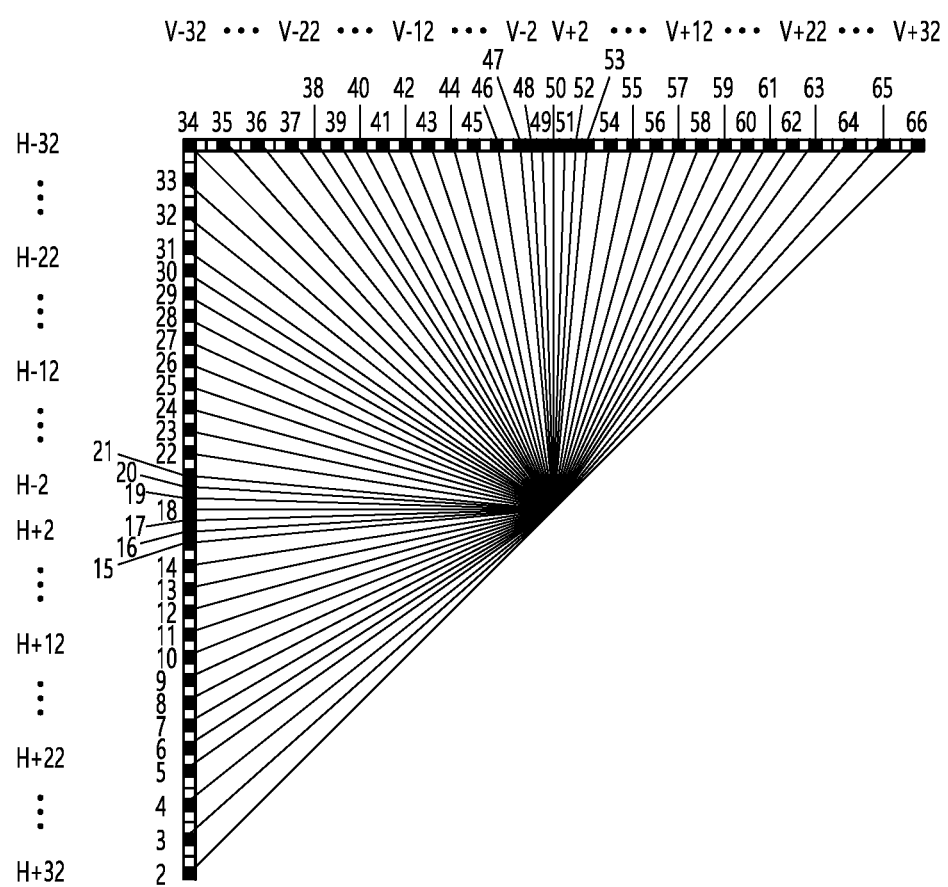
FIG. 7 illustrates intra-directional modes of 65 prediction directions.

FIG. 7 illustrates intra-directional modes of 65 prediction directions.

Referring to FIG. 7, intra-prediction modes having horizontal directionality and intra-prediction modes having vertical directionality may be classified based on an intra-prediction mode #34 having an upper left diagonal prediction direction. H and V in FIG. 7 represent the horizontal directionality and the vertical directionality, respectively, and the numbers from −32 to 32 represent displacements of 1/32 unit on sample grid positions. The intra-prediction modes #2 to #33 have the horizontal directionality and the intra-prediction modes #34 to #66 have the vertical directionality.

18 intra prediction mode and #50 intra prediction mode may represent a horizontal intra prediction mode and a vertical intra prediction mode, respectively. #2 intra prediction mode may be called a lower left directional diagonal intra prediction mode, #34 intra prediction mode may be called an upper left directional diagonal intra prediction mode, and #66 intra prediction mode may be called an upper right directional diagonal intra prediction mode.

Meanwhile, the prediction mode information may include flag information (e.g., prev_intra_luma_pred_flag) that represents whether the most probable mode (MPM) is applied to the current block or the remaining mode is applied to the current block. In addition, in the case that the MPM is applied to the current block, the prediction mode information may further include index information (e.g., mpm_idx) indicating one of the intra prediction mode candidates (e.g., MPM candidates). Meanwhile, the intra prediction mode candidates for the current block may be constructed by the MPM candidate list or the MPM list. That is, the MPM candidate list or the MPM list for the current block may be constructed, and the MPM candidate list or the MPM list may include the intra prediction mode candidates.

In addition, in the case that the MPM is not applied to the current block, the prediction mode information may further include remaining intra prediction mode information (e.g., rem_inra_luma_pred_mode) indicating one of the remaining intra prediction modes except the intra prediction mode candidates. The remaining intra prediction mode information may also be referred to as MPM remainder information.

The decoding device may determine an intra prediction mode of the current block based on the prediction mode information. The prediction mode information may be encoded/decoded through a coding method described below. For example, the prediction mode information may be encoded/decoded through entropy coding (e.g., CABAC, CAVLC) based on truncated binary code or truncated rice binary code.

Figure 8:
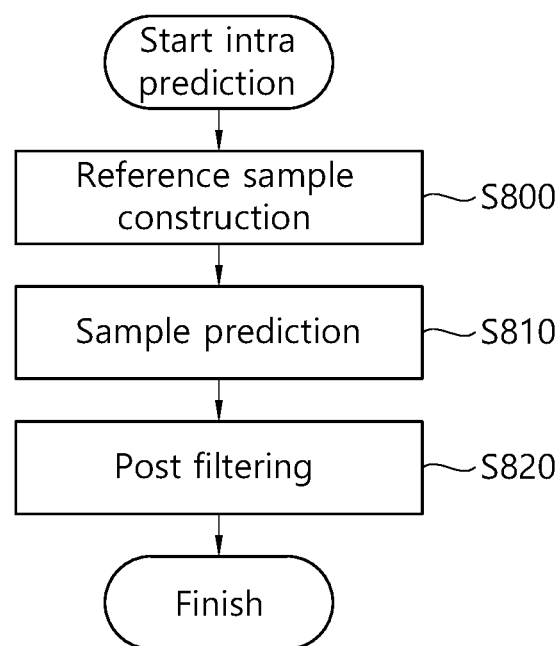
FIG. 8 illustrates an example of performing an intra prediction.

FIG. 8 illustrates an example of performing an intra prediction. Referring to FIG. 8, a general intra prediction may be performed by three steps. For example, in the case that the intra prediction is applied to a current block, the encoding device/decoding device may construct a reference sample (step, S800), derive a prediction sample for the current block based on the reference sample (step, S810) and perform a post filtering for the prediction sample (step, S820). The prediction unit of the encoding device/decoding device may obtain advantages of the intra prediction mode and known neighboring reference samples for generating unknown samples of the current block.

Figure 9:
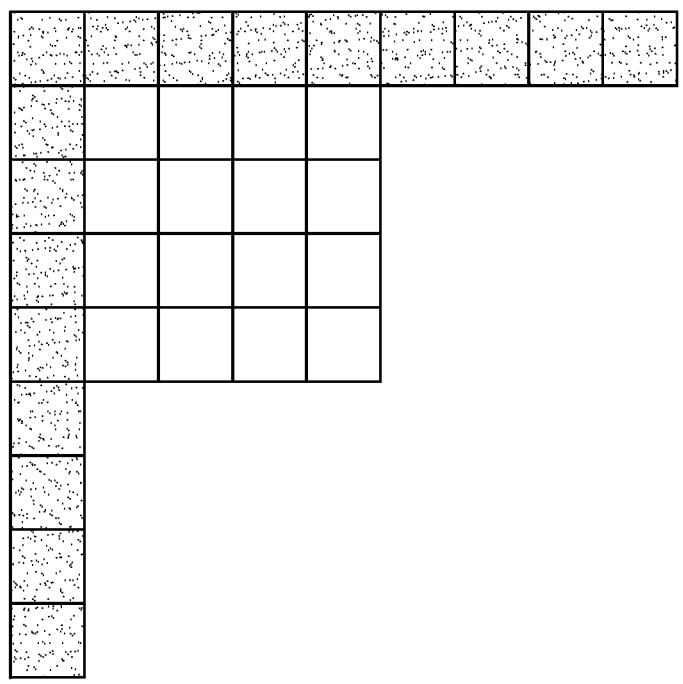
FIG. 9 illustrates the neighboring samples used for an intra prediction of the current block.

FIG. 9 illustrates the neighboring samples used for an intra prediction of the current block. Referring to FIG. 9, in the case that a size of the current block is W×H, the neighboring samples of the current block may include 2W upper neighboring samples, 2H left neighboring samples and upper left corner neighboring samples. For example, in the case that a size of the current block is W×H and x component of top left sample position of the current block is 0 and y component is 0, the left neighboring samples may be p[−1][0] to p[−1][2H−1], the upper left corner neighboring samples may be p[−1][−1] and the upper neighboring samples may be p[0][−1] to p[2W−1][−1]. A prediction sample of a target sample may be derived based on the neighboring sample located in a prediction direction of the intra prediction mode of the current block in accordance with the target sample of the current block. Meanwhile, a plurality of lines of neighboring samples may be used for an intra prediction of the current block.

Meanwhile, the encoding device may determine an optimal intra prediction mode for the current block by jointly optimizing a bit rate and a distortion. Later, the encoding device may code the prediction mode information for the optimal intra prediction mode in a bitstream. The decoding device may derive the optimal intra prediction mode by parsing the prediction mode information and perform an intra prediction of the current block based on the intra prediction mode. However, the increased number of intra prediction modes requires an efficient intra prediction mode coding for minimizing signaling overhead.

Accordingly, the present disclosure proposes embodiments for reducing signaling overhead in transmitting information for intra prediction.

Meanwhile, operators in the embodiments described below may be defined as the Table below.

TABLE 1

| | |
|---|---|
| Floor(x) | the largest integer less than or equal to x. |
| Log2(u) | the base-2 logarithm of u. |
| Ceil(x) | the smallest integer greater than or equal to x. |
| x >> y | Arithmetic right shift of a two's complement integer representation of x by y binary digits. This function is defined only for non-negative integer values of y. Bits shifted into the MSBs as a result of the right shift have a value equal to the MSB of x prior to the shift operation. |
| x << y | Arithmetic left shift of a two's complement integer representation of x by y binary digits. This function is defined only for non-negative integer values of y. Bits shifted into the LSBs as a result of the left shift have a value equal to 0. |
| > | Greater than. |
| >= | Greater than or equal to. |
| < | Less than. |
| <= | Less than or equal to. |
| == | Equal to. |
| != | Not equal to. |

Referring to Table 1, Floor(x) may represent a maximum integer value of x or smaller, Log 2(u) may represents a log value having 2 of u as a base and Ceil(x) may represent a minimum integer value of x or greater. For example, the case of Floor(5.93) may indicate 5, since a maximum integer value of 5.93 or smaller is 5.

In addition, referring to Table 1, x>>y may represent an operator that right-shifts x by y times and x<<y may represent an operator that left-shifts x by y times.

Generally, a current block and a neighboring block to be coded may have similar image property, and accordingly, since the current block and the neighboring block have high probability of having the same or similar intra prediction mode, to deriving the intra prediction mode applied to the current block, MPM list of the current block may be determined based on the intra prediction mode of the neighboring block. That is, for example, the MPM list may include the intra prediction mode of the neighboring block as an MPM candidate.

The neighboring block of the current block used for constructing the MPM list of the current block may be represented as below.

Figure 10:
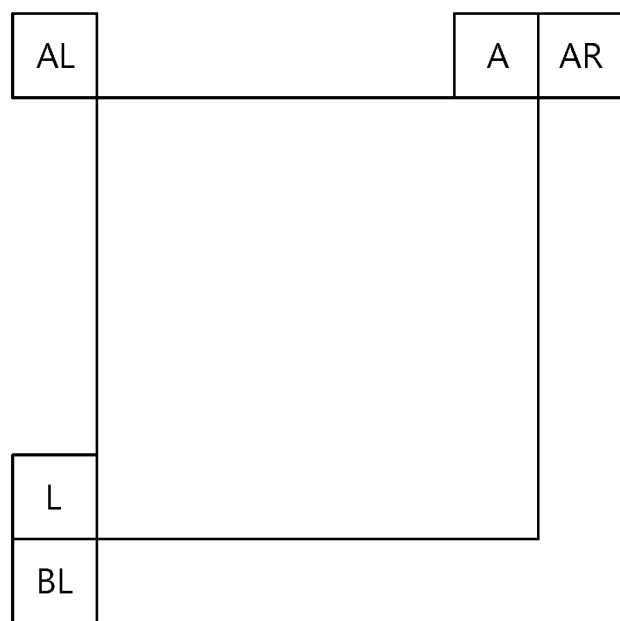
FIG. 10 illustrates neighboring blocks of the current block.

FIG. 10 illustrates neighboring blocks of the current block. Referring to FIG. 10, the neighboring blocks of the current block may include a left neighboring block, an upper neighboring block, a lower left neighboring block, an upper right neighboring block and/or an upper left neighboring block. Here, in the case that a size of the current block is W×H and x component of top left sample position of the current block is 0 and y component is 0, the left neighboring block may be a block including a sample of (−1, H−1) coordinate, the upper neighboring block may be a block including a sample of (W−1, −1) coordinate, the upper right neighboring block may be a block including a sample of (W, −1) coordinate, the lower left neighboring block may be a block including a sample of (−1, H) coordinate and the upper left neighboring block may be a block including a sample of (−1, −1) coordinate.

Meanwhile, this embodiment proposes a method for generating an MPM list efficiently in the case that an intra prediction is applied. This embodiment describes the case that the conventional intra prediction mode and a linear interpolation intra prediction (LIP) are used together. If more intra prediction coding techniques are used together, it may be extended in the same manner.

Figure 11:
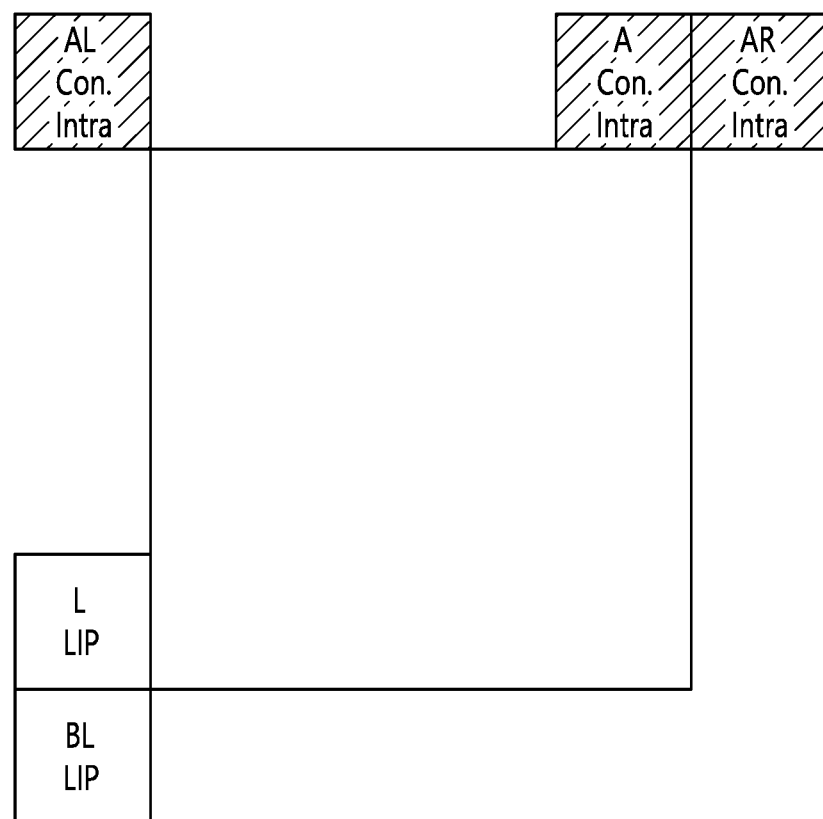
FIG. 11 illustrates a neighboring block encoded with the conventional intra prediction mode and a neighboring block encoded with the LIP mode among the neighboring blocks of the current block.

FIG. 11 illustrates a neighboring block encoded with the conventional intra prediction mode and a neighboring block encoded with the LIP mode among the neighboring blocks of the current block.

Referring to FIG. 11, the neighboring blocks of the current block may include a left neighboring block L, an upper neighboring block A, a lower left neighboring block BL, an upper right neighboring block AR and/or an upper left neighboring block AL. In addition, referring to FIG. 11, the upper neighboring block A, the upper left neighboring block AL and the upper right neighboring block AR may be encoded through the encoding method that uses the Conventional intra coding (Con. Intra), and the left neighboring block L and the lower left neighboring block BL may be encoded through the encoding method that uses the linear interpolation intra prediction (LIP) method.

The present disclosure proposes a method that an MPM list may be generated by taking priority to the block encoded by using the conventional intra prediction encoding method among neighboring blocks when generating the MPM list in the case that the current block is encoded by using the conventional intra prediction encoding method, and on the other hand, an MPM list is generated by taking priority to the block encoded by using the LIP intra prediction encoding method among neighboring blocks when generating the MPM list in the case that the current block is encoded by using the LIP intra prediction encoding method.

For example, in the case that the current block is encoded by using the conventional intra prediction encoding method, the MPM list of the current block may be constructed as below.

As an example, the MPM list may be generated by taking priority to the encoding information of a neighboring block as below.

First step: Add the block encoded by using the conventional intra prediction encoding method (i.e., the intra prediction mode of the block) to the MPM list first among neighboring blocks while searching neighboring blocks in the order of generating the existing MPM list Second step: Add the block encoded by using the LIP intra prediction encoding method (i.e., the intra prediction mode of the block) to the MPM list again while searching neighboring blocks in the order of generating the MPM list again Third step: While searching a mode having a directionality (Planar, excluding DC mode) in the MPM list, add a mode by taking −1 or +1 to the corresponding mode to the MPM list Fourth step: Add default modes to the MPM list Meanwhile, in the case that there is an overlapped mode, or in the case that the prediction mode is unusable in the corresponding block during the procedure, a next block may be searched without adding it to the MPM list. In addition, in the case that six MPM candidates are generated, the MPM list generation procedure may be terminated. The searching order for deriving the MPM candidate according to the procedure described above may be as below.

MPM list: A→Planar→DC→AR→AL→L→BL→(−1, +1 mode generation procedure for A, AR, AL, L, BL modes)→add a default mode In addition, as an example, the MPM list may be generated by taking priority over all mode information added when generating the MPM list as well as encoding information of a neighboring block as below.

First step: Add the block encoded by using the conventional intra prediction encoding method (i.e., the intra prediction mode of the block) to the MPM list first among neighboring blocks while searching neighboring blocks in the order of generating the existing MPM list Second step: While searching a mode having a directionality in the next MPM list, add a mode by taking −1 or +1 to the corresponding mode to the MPM list Third step: Add mode information of a block encoded by the LIP intra prediction method to the MPM list while searching neighboring blocks again Fourth step: Add a mode by taking −1 or +1 to the additionally generated mode (mode added in the linear interpolation intra prediction mode) in the MPM list Fifth step: Add default modes to the MPM list Meanwhile, in the case that there is an overlapped mode, or in the case that the prediction mode is unusable in the corresponding block during the procedure, a next block may be searched without adding it to the MPM list. In addition, in the case that six MPM candidates are generated, the MPM list generation procedure may be terminated. The searching order for deriving the MPM candidate according to the procedure described above may be as below.

MPM list: A→Planar→DC→AR→AL→(−1, +1 mode generation procedure for A, AR, AL modes) L→BL→(−1, +1 mode generation procedure for L, BL modes)→add a default mode In addition, for example, in the case that the current block is encoded by using the LIP intra prediction encoding method, the MPM list of the current block may be constructed as below. Different from the case described above, the MPM list is generated by taking priority to the LIP intra prediction encoding method.

As an example, the MPM list may be generated by taking priority to the encoding information of a neighboring block as below.

First step: Add the block encoded by using the LIP intra prediction encoding method (i.e., the intra prediction mode of the block) to the MPM list first among neighboring blocks while searching neighboring blocks in the order of generating the existing MPM list Second step: Add the block encoded by using the LIP intra prediction encoding method to the MPM list again while searching neighboring blocks in the order of generating the MPM list again Third step: While searching a mode having a directionality (Planar, excluding DC mode) in the MPM list, add a mode by taking −1 or +1 to the corresponding mode to the MPM list Fourth step: Add default modes to the MPM list Meanwhile, in the case that there is an overlapped mode, or in the case that the prediction mode is unusable in the corresponding block during the procedure, a next block may be searched without adding it to the MPM list. In addition, in the case that six MPM candidates are generated, the MPM list generation procedure may be terminated. The searching order for deriving the MPM candidate according to the procedure described above may be as below.

MPM list: A→Planar→DC→AR→AL→L→BL→(−1, +1 mode generation procedure for A, AR, AL, L, BL modes)→add a default mode In addition, as an example, the MPM list may be generated by taking priority over all mode information added when generating the MPM list as well as encoding information of a neighboring block as below.

First step: Add the block encoded by using the LIP intra prediction encoding method (i.e., the intra prediction mode of the block) to the MPM list first among neighboring blocks while searching neighboring blocks in the order of generating the existing MPM list Second step: While searching a mode having a directionality in the MPM list, add a mode by taking −1 or +1 to the corresponding mode to the MPM list Third step: Add mode information of a block encoded by the conventional intra prediction method to the MPM list while searching neighboring blocks again Fourth step: Add a mode by taking −1 or +1 to the additionally generated mode (mode added in the conventional intra prediction mode) in the MPM list Fifth step: Add default modes to the MPM list Meanwhile, in the case that there is an overlapped mode, or in the case that the prediction mode is unusable in the corresponding block during the procedure, a next block may be searched without adding it to the MPM list. In addition, in the case that six MPM candidates are generated, the MPM list generation procedure may be terminated. The searching order for deriving the MPM candidate according to the procedure described above may be as below.

MPM list: A→Planar→DC→AR→AL→(−1, +1 mode generation procedure for A, AR, AL modes) L→BL→(−1, +1 mode generation procedure for L, BL modes)→add a default mode As described above, the MPM list generation method may be proposed for the case that the conventional intra prediction encoding and the LIP intra prediction encoding are used. In addition, in the case that other intra prediction encoding method is used, the MPM list may be generated by the method described above. That is, the MPM list may be generated by tacking priority to the neighboring block encoded by the prediction method the same as the prediction method for which the current block is encoded.

In addition, in the MPM list generation method described above, the number of candidate modes (i.e., MPM candidates) in the MPM list may be changeably determined depending on the number of intra prediction modes, and a position of the neighboring block for generating the candidate mode may be randomly determined. Or, the number of neighboring blocks to search and the search order may also be randomly determined. In addition, the number of default modes may be changeably determined depending on the number of candidate modes in the MPM list. Furthermore, a mode determined with a default mode set may be randomly determined.

The decoding device may construct the MPM list of the current block and derive the MPM candidate indicated by an MPM index among the MPM candidates of the MPM list as the intra prediction mode of the current block. The MPM index may be signaled in the case that one of the MPM candidates is the optimal intra prediction mode for the current block, and accordingly, overhead may be minimized. The index indicating the MPM candidates may be coded with truncated unary code. That is, the MPM index may be binarized by using the truncated unary code. The value of the MPM index binarized by using the truncated unary code may be represented as the Table below.

TABLE 2

0 → 0
1 → 1 0
2 → 1 1 0
3 → 1 1 1 0
4 → 1 1 1 1 0
5 → 1 1 1 1 1
   | | | | |
Bin: 0 1 2 3 4

Referring to Table 2, the MPM index may be derived as binary values of 1 to 5 bins depending on the represented value. Since the bin of binary value is small as the value of the MPM index is small which is binarized through the truncated unary code, an order of the MPM candidates may be important to reduce an amount of bit. In addition, the truncated unary code may also be referred to as Truncated Rice code.

For example, the Most Probable Mode (MPM) list of the current block may include 6 MPM candidates, and the MPM candidates may be constructed in an order of an intra prediction mode of a left neighboring block, an intra prediction mode of an upper neighboring block, a planar intra prediction mode, a DC intra prediction mode, an intra prediction mode of a lower left neighboring block, an intra prediction mode of an upper right neighboring block and an intra prediction mode of an upper left neighboring block. Meanwhile, in the case that an optimal intra prediction mode for the current block is not included in the MPM list, an MPM flag may be signaled to indicate an exception. That is, the MPM flag may indicate whether an intra prediction mode applied to the current block is included in the MPM candidates or included in the remaining intra prediction modes which are not included in the MPM candidates. Particularly, in the case that the value of MPM flag is 1, the MPM flag may indicate that an intra prediction mode of the current block is included in the MPM candidates (MPM list), and in the case that the value of MPM flag is 0, the MPM flag may indicate that an intra prediction mode of the current block is not included in the MPM candidates (MPM list) but included in the remaining intra prediction modes.

Meanwhile, the optimal intra prediction mode for the current block, that is, an index representing an intra prediction mode applied to the current block may be coded by using a variable length coding or a fixed length coding. In addition, the number of MPM candidates included in the MPM list may be determined based on the number of intra prediction modes. For example, as the number of intra prediction modes increase, the number of MPM candidates may increase or may not. For example, the MPM list may include 3 MPM candidates, 5 MPM candidates or 6 MPM candidates.

Meanwhile, as described above, an index representing an intra prediction mode applied to the current block may be coded by using a variable length coding or a fixed length coding. Here, in the case that the index is coded by the variable length coding, as the probability that an intra prediction mode of higher order (i.e., an intra prediction mode corresponding to the case that the index value is small) is selected is higher, an amount of bit of the prediction mode information representing an intra prediction mode of an image, and accordingly, a coding efficiency may be improved in comparison with the case that the fixed length coding is used.

As the variable length coding, the truncated binary coding may be used.

For example, in the case that total u symbols are coded by the truncated binary coding, the first l symbols may be coded by using k bits, and u−l symbols, that is, the symbols excluding l symbols from the total u symbols may be coded by using k+1 bit. Here, the first l symbols may represent l symbols of high order. Meanwhile, the symbols may be values in which information may be represented.

Here, the k may be derived as represented in the following Equation.

$$k = \text{floor}(\text{Log } 2(u)) \quad \text{[Equation 1]}$$

In addition, the l may be derived as represented in the following Equation.

$$l = 2^{k+1} - u \quad \text{[Equation 2]}$$

For example, k and l according to the symbol number in which the truncated binary coding may be used may be derived as represented in the following Table.

TABLE 3

| Total number of symbols u | k bit to code symbols first l symbols | First l symbols |
|---|---|---|
| 29 | 4 | 3 |
| 61 | 5 | 3 |
| 62 | 5 | 2 |

In addition, for example, in the case that the number of total symbols is 61 (u=61), a binary value for each symbol according to the truncated binary coding may be derived as represented in the following Table.

TABLE 4

| Input symbols | Mapped value | binary | Number of bits use to code |
|---|---|---|---|
| 0 | 0 | 00000 | 5 |
| 1 | 1 | 00001 | 5 |
| 2 | 2 | 00010 | 5 |
| 3 | 6 | 000110 | 6 |
| 4 | 7 | 000111 | 6 |
| 5 | 8 | 001000 | 6 |
| ... | ... | | ... |
| 60 | 63 | 111111 | 6 |

Referring to Table 4, in the case that the number of total symbols is 61 (i.e., c Max+1), the k may be derived to 5, and the l may be derived to 3. Accordingly, symbols 0 to 2 may be coded with a binary value having 5-bit number, and the remaining symbols may be coded with a binary value having 6 (i.e., k+1)-bit number.

Meanwhile, the symbols may represent indexes of the intra prediction mode list. That is, indexes of the intra prediction modes of a specific order. For example, the intra prediction mode list may be a list constructed in an ascending order of mode numbers as below.

{0, 1, 2, . . . , 64, 65, 66}

Alternatively, for example, the intra prediction mode list may be a list constructed in a pre-defined order as below.

{66, 50, 34, . . . , 2, 18}

The present disclosure proposes a method for coding information for representing an intra prediction mode by using the truncated binary coding described above.

Figure 12:
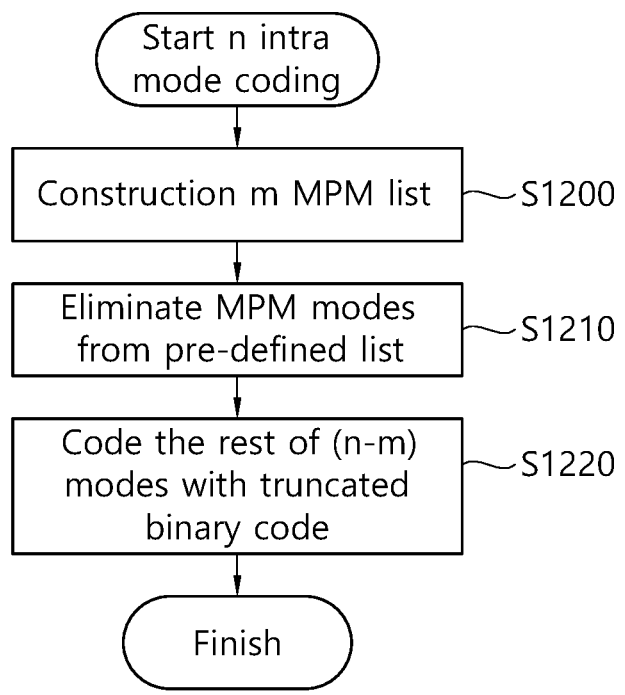
FIG. 12 illustrates a method for coding information for representing n intra prediction modes including the MPM candidates and the remaining intra prediction modes.

FIG. 12 illustrates a method for coding information for representing n intra prediction modes including the MPM candidates and the remaining intra prediction modes.

Referring to FIG. 12, the encoding device constructs the MPM list including m MPM candidates (step, S1200). Later, the encoding device may remove the MPM candidates in the pre-defined intra prediction mode list (step, S1210). And then, the encoding device may code indexes representing the (n-m) remaining intra prediction modes by using the truncated binary coding (step, S1220). That is, an index representing one of the (n-m) remaining intra prediction modes may be coded by using the truncated binary coding. For example, in the case that the index value is N, the remaining intra prediction mode information may represent the N+1$^{th}$ intra prediction mode in the (n-m) remaining intra prediction modes. As described above, the indexes representing the (n-m) remaining intra prediction modes may be coded with the truncated binary code. That is, for example, in the case that the index value is N, the index may be binarized with a binary value corresponding to N in the truncated binary code.

Meanwhile, the intra prediction mode list may be referred to as an intra mode map. The intra mode map may represent a pre-defined order of total u intra prediction modes. That is, the intra mode map may represent the intra prediction modes except the MPM candidates in the intra prediction modes of the pre-defined order. The remaining intra prediction modes except the m MPM candidates in the entire intra prediction modes may be mapped to symbols of the indexes in an order according to the intra mode map (i.e., a pre-defined order). For example, an index of the intra prediction mode which is the first order in the intra mode map among the intra prediction modes except the m MPM candidates may be 0, and an index of the intra prediction mode of n$^{th}$ order may be n−1.

In addition, since the first 1 symbols of the truncated binary code use smaller bit number than the remaining symbols, for example, an intra mode map may be proposed, which the intra prediction modes having high probability of being selected as the optimal intra prediction mode in Rate-Distortion Optimization (RDO) process are included in the order described above. For example, the intra mode map may be represented as below. That is, the intra prediction modes of the pre-defined order may be represented as below.

{0, 1, 50, 18, 49, 10, 12, 19, 11, 34, 2, 17, 54, 33, 46, 51, 35, 15, 13, 45, 22, 14, 66, 21, 47, 48, 23, 53, 58, 16, 42, 20, 24, 44, 26, 43, 55, 52, 37, 29, 39, 41, 25, 9, 38, 56, 30, 36, 32, 28, 62, 27, 40, 8, 3, 7, 57, 6, 31, 4, 65, 64, 5, 59, 60, 61, 63}

For example, in the case that the number of intra prediction modes is 67 and the number of MPM candidates is 6 (i.e., 6 MPM candidates are used), 61 remaining intra prediction modes may be coded by using the truncated binary code. That is, the indexes for the remaining intra prediction modes may be coded by using the truncated binary code. In the case that the 6 MPM candidates are derived, the intra mode map may be arranged except the 6 MPM candidates. That is, the intra mode map represent the intra prediction modes except the MPM candidate in the intra prediction modes of the pre-defined order. Later, to reduce an amount of bit, 1 intra prediction modes (1 for u, which is 61, is 3) of higher order, that is, 3 intra prediction modes of high order in the intra mode map among the remaining intra prediction modes may be coded with 00000, 00001 and 00010, which is k bits (1 for u, which is 61, is 5). That is, the index of the first intra prediction mode according to the intra mode map among the 61 remaining intra prediction modes may be coded with a binarized value of 00000, the index of the second intra prediction mode may be coded with a binarized value of 00001, and the index of the third intra prediction mode may be coded with a binarized value of 00010. In addition, 58 intra prediction modes except the 3 intra prediction modes may be coded with 6-bit truncated binary code such as 000100 and 000101. That is, the indexes of the 58 intra prediction modes except the 3 intra prediction modes may be coded with 6-bit truncated binary code such as 000100 and 000101.

The present disclosure also proposes another embodiment that information for representing an intra prediction mode is coded by using the truncated binary code.

Figure 13:
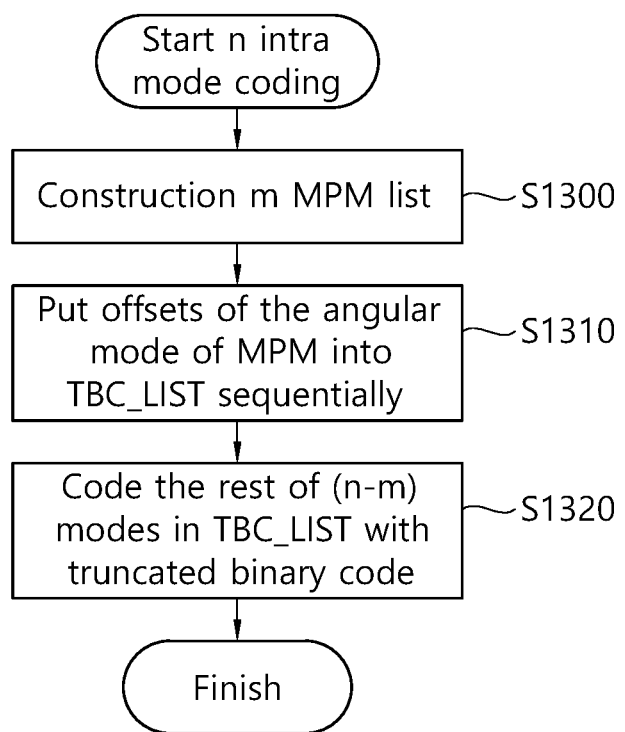
FIG. 13 illustrates a method for coding information for representing n intra prediction modes including the MPM candidates and the remaining intra prediction modes.

FIG. 13 illustrates a method for coding information for representing n intra prediction modes including the MPM candidates and the remaining intra prediction modes.

Referring to FIG. 13, the encoding device constructs the MPM list including m MPM candidates (step, S1300). Later, the encoding device may include an offset of a directional intra prediction mode among the MPM candidates in TBC list (step, S1310). For example, in the case that the directional intra prediction mode, which is the MPM candidates, is #n intra prediction mode, #n+offset, summing the offset to the n, intra prediction mode may be derived, and TBC list including the #n+offset intra prediction mode may be constructed. Here, the offset may be started from −1, +1, −2, +2, . . . , −4, +4. Later, the indexes representing the (n-m) remaining intra prediction modes may be coded by using the truncated binary coding (step, S1320). As described above, the indexes representing the (n-m) remaining intra prediction modes may be coded by using the truncated binary coding.

For example, in the case that the number of intra prediction modes is 67 and the number of MPM candidates is 6, 61 remaining intra prediction modes may be coded by using the truncated binary code. That is, the indexes for the remaining intra prediction modes may be coded by using the truncated binary code. For example, the 6 MPM candidates included in the MPM list is {50, 8, 0, 1, 66, 54}, the TBC list may be constructed with {49, 51, 7, 9, 65, 53, 55, . . . }. Particularly, among the MPM candidates, the directional intra prediction mode may be #50 intra prediction mode, #8 intra prediction mode, #66 intra prediction mode and #54 intra prediction mode, and the intra prediction mode derived based on the #50 intra prediction mode, the #8 intra prediction mode, the #66 intra prediction mode, the #54 intra prediction mode and the offset may be included in the TBC list.

Later, to reduce an amount of bit, 1 intra prediction modes (1 for u, which is 61, is 3) of higher order, that is, 3 intra prediction modes of high order in the TBC list among the remaining intra prediction modes may be coded with 00000, 00001 and 00010, which is k bits (1 for u, which is 61, is 5). That is, the index of #49 intra prediction mode, which is the first intra prediction mode in the TBC list may be coded with a binarized value of 00000, the index of #51 intra prediction mode, which is the second intra prediction mode may be coded with a binarized value of 00001, and the index of #7 intra prediction mode, which is the third intra prediction mode may be coded with a binarized value of 00010. In addition, 58 intra prediction modes except the 3 intra prediction modes may be coded with 6-bit truncated binary code such as 000100 and 000101. That is, the indexes of the 58 intra prediction modes except the 3 intra prediction modes may be coded with 6-bit truncated binary code such as 000100 and 000101.

Meanwhile, the MPM index may be signaled in the form of mpm_idx[x0+i][y0+j] (or mpm_idx) syntax element, and the remaining intra prediction mode information may be signaled in the form of rem_intra_luma_pred_mode[x0+i][y0+j] (or rem_intra_luma_pred_mode) syntax element. Alternatively, the MPM index may be signaled in the form of intra_luma_mpm_idx[xCb][yCb] syntax element, and the remaining intra prediction mode information may be signaled in the form of intra_luma_mpm_remainder[xCb][yCb] syntax element. Here, the MPM index may indicate one of the MPM candidates, and the remaining intra prediction mode information may indicate one of the remaining intra prediction modes except the MPM candidates. In addition, array indices (x0+i, y0+i) may indicate a position (x0+i, y0+i) of a top-left luma sample of a prediction block based on the top-left luma sample of a picture. Furthermore, array indices (xCb, yCb) may indicate a position (xCb, yCb) of a top-left luma sample of a prediction block based on the top-left luma sample of a picture.

In addition, binarization for the remaining mode coding may be derived by invoking Truncated Binary (TB) binarization process of which c Max value is equal to (num_intra_mode−mpm_idx). That is, binarization for the remaining mode coding may be performed by the Truncated Binary binarization process of which c Max value is equal to a value of the total intra prediction modes minus the number of MPM candidates. Here, the num_intra_mode may represent the number of total intra prediction modes, and the mpm_idx may represent the number of MPM candidates. In addition, for example, the c Max may be pre-defined as 60. Alternatively, the c Max may be pre-defined as a value of the entire intra prediction modes minus the number of MPM candidates, or the c Max may be pre-defined as a value of the total intra prediction modes minus the number of MPM candidates, and minus 1.

Particularly, the Truncated Binary binarization process may be performed as below.

An input to the process may be a request for TB binarization for a syntax element having synVal value and c Max value. Here, the synVal may represent a value of the syntax element, and the c Max may represent a maximum value that the syntax element may represent. In addition, an output of the process may be a request for TB binarization of the syntax element. A bin string of the TB binarization process of the syntax element synVal may be designated as described below.

$$n = c\ \text{Max} + 1$$

$$k = \text{Floor}(\log 2(n))\ \text{so that}\ 2^k <= n < 2^{k+1}$$

$$u = 2^{k+1} - n \quad \text{[Equation 3]}$$

Herein, when the c Max is equal to 0, the TB binarization process of the syntax element may be a NULL bin string.

In addition, in the case that the c Max is not equal to 0 and the synVal is smaller than u, the TB bin string may be derived by invoking a Fixed Length (FL) binarization process for synVal having an input symbolVal and c Max set to k. That is, in the case that the c Max is not equal to 0 and the synVal is smaller than u, the TB bin string may be derived based on the FL binarization process for synVal having an input symbolVal and c Max set to k. According to a length of a binarization in the Fixed Length (FL) binarization process described below, that is, Equation 4 for deriving a bit number, a bit number may be derived to k for c Max set to k. Accordingly, in the case that the synVal is smaller than u, a binarization value of k bit for the synVal may be derived.

Furthermore, in the case that the c Max is not equal to 0 and the synVal is greater than or equal to u, the TB bin string may be derived by invoking a Fixed Length (FL) binarization process for synVal+u having an input symbolVal and c Max set to k+1. That is, in the case that the c Max is not equal to 0 and the synVal is greater than or equal to u, the TB bin string may be derived based on the FL binarization process for synVal+u having an input symbolVal and c Max set to k+1. According to a length of a binarization in the Fixed Length (FL) binarization process described below, that is, Equation 4 for deriving a bit number, a bit number may be derived to k for c Max set to k+1. Accordingly, in the case that the synVal is greater than or equal to u, a binarization value of k+1 bit for the synVal may be derived.

In addition, as another example, the binarization for a remaining mode coding may be derived by invoking the Fixed Length (FL) binarization process of which c Max value is equal to (num_intra_mode−mpm_idx−1). That is, the binarization for the remaining mode coding may be performed by the FL binarization process of which c Max value is the number of total intra prediction modes minus the number of MPM candidates, and minus 1. Herein, the num_intra_mode may represent the number of total intra prediction modes, and mpm_idx may represent the number of MPM candidates.

Particularly, the FL binarization process may be performed as below.

An input of the process may be a request for c Max and FL binarization. In addition, an output of the process may be FL binarization that associates each symbolVal value with a corresponding bin string.

The FL binarization may be constructed by using unsigned integer bin string of fixed length of the symbol value symbolVal.

Here, the fixed length may be derived as represented in the Equation below.

$$\text{fixedLength} = \text{Ceil}(\log 2(c\ \text{Max} + 1)) \quad \text{[Equation 4]}$$

Here, the fixed Length may represent the fixed length.

In the indexing of bins for the FL binarization, binIdx=0 may be associated with the most important bit and associated with unimportant bit as the binIdx value increases, and then, the case of which binIdx value is the greatest may be associated to the most unimportant bit.

With respect to the contents described above, the remaining intra prediction mode information may be coded with being binarized with the TR binarization process or the FL binarization process.

For example, the MPM flag, the MPM index and the remaining intra prediction mode may be binarized as represented in the Table below.

TABLE 5

| Syntax structure | Syntax element | Binarization | |
|---|---|---|---|
| | | Process | Input parameters |
| ... | prev intra luma pred flag[ ][ ] | FL | cMax – 1 |
| coding unit( ) | rem intra luma pred mode[ ][ ] | FL | cMax – number of total intramode – mpm_idx |
| | mpm idx[ ][ ] | TR | cMax – mpm idx-1, cRiceParam – 0 |
| | ... | ... | ... |

Herein, prev_intra_luma_pred_flag[ ][ ] is a syntax element representing the MPM flag, rem_intra_luma_pred_mode[ ][ ] is a syntax element representing the remaining intra prediction mode information and mpm_idx[ ][ ] is a syntax element representing the MPM index. Referring to Table 5 above, the MPM flag may be binarized with the FL binarization process and c Max, which is an input parameter of the FL binarization process may be pre-configured as 1. In addition, referring to Table 5 above, the remaining intra prediction mode information may be binarized with the FL binarization process and c Max, which is an input parameter of the FL binarization process may be the number of total intra prediction modes minus the number of MPM candidates. For example, in the case that the number of total intra prediction modes is 67 and the number of MPM candidates is 6, considering 61 remaining intra prediction modes from 0 to 60 (i.e., the index values indicating the remaining intra prediction modes is 0 to 60), the c Max may be 60. As another example, considering 61 remaining intra prediction modes from 1 to 61 (i.e., the index values indicating the remaining intra prediction modes is 1 to 61), the c Max may be 61. Meanwhile, for example, the number of MPM candidates may be 3. In addition, referring to Table 5 above, the MPM index may be binarized with Truncated Rice (TR) binarization process, and c Max, which is an input parameter of the TR binarization process may be the number of MPM candidates minus 1, and cRiceParam may be 0. For example, in the case that the number of MPM candidates is 6, the c Max may be 5. Meanwhile, for example, the number of MPM candidates may be 3.

Alternatively, for example, the MPM index and the remaining intra prediction mode information may be binarized as represented in the Table below.

TABLE 6

| Syntax structure | Syntax element | Binarization | |
|---|---|---|---|
| | | Process | Input parameters |
| ... | ... | ... | ... |
| coding unit( ) | rem_intra_luma_pred_mode[ ][ ] | TB | cMax = number of total intramode – mpm idx – 1 |
| | mpm_idx[ ][ ] | TR | cMax = mpm_idx-1, cRiceParam = 0 |
| | ... | ... | ... |

Herein, rem_intra_luma_pred_mode[ ][ ] is a syntax element representing the remaining intra prediction mode information and mpm_idx[ ][ ] is a syntax element representing the MPM index. Referring to Table 5 above, the remaining intra prediction mode information may be binarized with the TB binarization process, and c Max, which is an input parameter of the TB binarization process may be the number of total intra prediction modes minus the number of MPM candidates and minus 1. For example, in the case that the number of total intra prediction modes is 67 and the number of MPM candidates is 6, the c Max may be 60. That is, for example, the c Max may be pre-configured as 60. For example, in the case that the number of total intra prediction modes is 67 and the number of MPM candidates is 6, considering 61 remaining intra prediction modes from 0 to 60 (i.e., the index values indicating the remaining intra prediction modes is 0 to 60), the c Max may be 60. As another example, considering 61 remaining intra prediction modes from 1 to 61 (i.e., the index values indicating the remaining intra prediction modes is 1 to 61), the c Max may be 61. That is, the c Max may be a maximum value that the remaining intra prediction mode information may represent. Meanwhile, for example, the number of MPM candidates may be 3. In addition, referring to Table 6 above, the MPM index may be binarized with Truncated Rice (TR) binarization process, and c Max, which is an input parameter of the TR binarization process may be the number of MPM candidates minus 1, and cRiceParam may be 0. For example, in the case that the number of MPM candidates is 6, the c Max may be 5. Meanwhile, for example, the number of MPM candidates may be 3.

Meanwhile, as an example, the MPM index may be encoded/decoded based on a context model. In relation to an encoding/decoding method of the MPM index based on the context model, the present disclosure proposes a method for deriving the context model based on an intra prediction mode.

For example, an assignment of the context model for the MPM index may be as represented in the Table below.

TABLE 7

If(NUM_INTRA_MODE == INTRA_DC || NUM_INTRA_MODE == INTRA_PLANAR)
   mpmCtx =1
else if (NUM_INTRA_MODE <= INTRA_ANGULAR34 )
   mpmCtx =2
else
   mpmCtx =2

Herein, for example, NUM_INTRA_MODE may represent the number of intra prediction mode indicated by the $M^{th}$ MPM candidate included in the MPM list. That is, in the case that the M$^{th}$ MPM candidate is #N intra prediction mode, the NUM_INTRA_MODE may represent N. In addition, mpmCtx may represent the context model for the MPM index. In this case, based on the M$^{th}$ MPM candidate included in the MPM list, the context model for M$^{th}$ bin of the MPM index may be derived. Here, M may be 3 or less.

For example, the context model for the first bin in the intra prediction mode information for the current block may be derived based on the first candidate included in the MPM list. In addition, the context model for the second bin may be derived based on the second candidate included in the MPM list, and the context model for the third bin may be derived based on the third candidate included in the MPM list.

Meanwhile, the number of intra prediction mode may be as represented in the Table below.

TABLE 8

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |

Referring to Table 7, in the case that the number of the intra prediction mode indicated by the M$^{th}$ MPM candidate is the number of DC intra prediction mode (i.e., 1) or in the case that the number of the intra prediction mode is planar intra prediction mode (i.e., 0), the context model for M$^{th}$ bin of the MPM index may be derived as context model 1. In other words, in the case that the M$^{th}$ MPM candidate is DC intra prediction mode or in the case that the M$^{th}$MPM candidate is planar intra prediction mode, the context model for M$^{th}$ bin of the MPM index may be derived as context model 1.

In addition, in the case of not corresponding to the condition described above, and in the case that the number of the intra prediction mode indicated by the M$^{th}$ MPM candidate is 34 or less, the context model for M$^{th}$ bin of the MPM index may be derived as context model 2. In other words, in the case that the M$^{th}$ MPM candidate is not DC intra prediction mode and not planar intra prediction mode, and in the case that the M$^{th}$ MPM candidate is #2 intra prediction mode to #34 intra prediction mode, the context model for M$^{th}$ bin of the MPM index may be derived as context model 2.

Further, in the case of not corresponding to all the conditions described above, the context model for M$^{th}$ bin of the MPM index may be derived as context model 2 or context model 3. In other words, in the case that the M$^{th}$ MPM candidate is #35 intra prediction mode to #66 intra prediction mode, the context model for M$^{th}$ bin of the MPM index may be derived as context model 2 or context model 3.

Alternatively, as another example, an assignment of the context mode for the MPM index may be as represented in the Table below.

TABLE 9

```
If( NUM_INTRA_MODE == INTRA_PLANAR )
    mpmCtx = 1
else if (NUM_INTRA_MODE == INTRA_DC )
    mpmCtx =2
else if (NUM_INTRA_MODE <= INTRA_ANGULAR34 )
    mpmCtx =3
else
    mpmCtx =4
```

For example, referring to Table 9, in the case that the number of the intra prediction mode indicated by the M$^{th}$ MPM candidate is planar intra prediction mode (i.e., 0), the context model for M$^{th}$ bin of the MPM index may be derived as context model 1. In other words, in the case that the M$^{th}$ MPM candidate is planar intra prediction mode, the context model for M$^{th}$ bin of the MPM index may be derived as context model 1.

In addition, in the case of not corresponding to the condition described above, and in the case that the number of the intra prediction mode indicated by the M$^{th}$ MPM candidate is DC intra prediction mode (i.e., 1), the context model for M$^{th}$ bin of the MPM index may be derived as context model 2. In other words, in the case that the M$^{th}$ MPM candidate is not planar intra prediction mode, and in the case that the M$^{th}$ MPM candidate is DC intra prediction mode, the context model for M$^{th}$ bin of the MPM index may be derived as context model 2.

Further, in the case of not corresponding to the conditions described above, and in the case that the number of the intra prediction mode indicated by the M$^{th}$ MPM candidate is 34 or less, the context model for M$^{th}$ bin of the MPM index may be derived as context model 3. In other words, in the case that the M$^{th}$ MPM candidate is not DC intra prediction mode and not planar intra prediction mode, and in the case that the M$^{th}$ MPM candidate is #2 intra prediction mode to #34 intra prediction mode, the context model for M$^{th}$ bin of the MPM index may be derived as context model 3.

In addition, in the case of not corresponding to all the conditions described above, the context model for M$^{th}$ bin of the MPM index may be derived as context model 4. In other words, in the case that the M$^{th}$ MPM candidate is not DC intra prediction mode, planar intra prediction mode, and #2 intra prediction mode to #34 intra prediction mode, but #35 intra prediction mode to #66 intra prediction mode, the context model for M$^{th}$ bin of the MPM index may be derived as context model 4.

Further, for example, ctxInc for a syntax element having bins coded based on a context of the MPM index may be as represented in the Table below.

TABLE 10

| Syntax element | binIdx | | | | | |
|---|---|---|---|---|---|---|
| | 0 | 1 | 2 | 3 | 4 | >=5 |
| rem_intra_luma_pred_mode[ ][ ] | bypass | bypass | bypass | bypass | bypass | bypass |
| mpm_idx[ ][ ] | 0 | 1 | 2 | bypass | bypass | na |

Herein, rem_intra_luma_pred_mode[ ][ ] may be a syntax element representing the remaining intra prediction mode information, and mpm_idx[ ][ ] may be a syntax element representing the MPM index. In addition, binIdx may represent a bin index of a syntax element.

Referring to Table 10, bin 0, bin 1 and bin 2 of the MPM index may be coded based on the context model, ctxInc for the bin 0 may be derived as 0, ctxInc for the bin 1 may be derived as 1, and ctxInc for the bin 2 may be derived as 2. Meanwhile, a bypass coding may be applied to bin 3 and bin 4 of the MPM index. The bypass coding may represent a coding method by applying a uniform probability distribution (e.g., 50:50) instead of applying the context model having a specific probability distribution.

Meanwhile, for example, in the case that the MPM flag and the MPM index are coded based on the context model, a context index ctxInc of the context model according to an initialization type of the MPM flag and the MPM index may be as represented in the Table below.

TABLE 11

| Syntax structure | Syntax element | ctxTable | initType | | |
|---|---|---|---|---|---|
| | | | 0 | 1 | 2 |
| coding_unit( ) | ... | ... | | | |
| | prev_intra_luma_pred_flag[ ][ ] | Table 13 | 0 | 1 | 2 |
| | mpm_idx[ ][ ] | Table 14 | 0 ... 2 | 3 ... 5 | 6 ... 8 |
| | ... | ... | | | |

Herein, initType may represent the initialization type, prev_intra_luma_pred_flag[ ][ ] may be a syntax element representing the MPM flag, and mpm_idx[ ][ ] may be a syntax element representing the MPM index. In addition, the ctxTable may indicate the Table that represents an initial value according to the context index indicating the context model of the corresponding syntax element. For example, in addition, the initial value according to the context index of the MPM flag may be derived based on Table 13 described below, and the initial value according to the context index of the MPM index may be derived based on Table 14 described below.

Here, a value of the initialization type may be derived based on a slice type and/or CABAC initial flag. For example, the value of the initialization type may be derived as below.

TABLE 12

```
if( slice_type = = I )
    initType = 0
else if( slice_type = = P )
    initType = cabac_init_flag ? 2 : 1
else
    initType = cabac_init_flag ? 1 : 2
```

Referring to Table 12, in the case that the slice type of a current slice in which a current block is included is I-slice (Intra slice), the value of the initialization type may be derived as 0. Further, referring to Table 12, in the case that the slice type of a current slice in which a current block is included is P-slice (Predictive slice), when the CABAC initial flag value is 1, the value of the initialization type may be derived as 2, and when the CABAC initial flag value is 0, the value of the initialization type may be derived as 1. Furthermore, referring to Table 12, in the case that the slice type of a current slice in which a current block is included is B-slice (Bi-predictive slice), when the CABAC initial flag value is 1, the value of the initialization type may be derived as 1, and when the CABAC initial flag value is 0, the value of the initialization type may be derived as 2. Meanwhile, the method of deriving the initialization type according to Table 12 described above may be a method disclosed by video/image coding standard.

Referring to Table 11 again, in the case that the value of the initialization type is 0, the context index for the MPM flag may be derived as 0, in the case that the value of the initialization type is 1, the context index for the MPM flag may be derived as 1, and in the case that the value of the initialization type is 2, the context index for the MPM flag may be derived as 2. The context index may indicate the context model for coding the MPM flag. Accordingly, in the case that the value of the initialization type is 0, the context model for the MPM flag may be derived as 0, in the case that the value of the initialization type is 1, the context model for the MPM flag may be derived as 1, and in the case that the value of the initialization type is 2, the context model for the MPM flag may be derived as 2.

In addition, referring to Table 11, in the case that the value of the initialization type is 0, the context index for the MPM index may be derived as 0, 1 or 2, in the case that the value of the initialization type is 1, the context index for the MPM index may be derived as 3, 4 or 5, and in the case that the value of the initialization type is 2, the context index for the MPM index may be derived as 6, 7 or 8.

Meanwhile, the context index may be derived as the sum of ctxInc and ctxIdxOffset. The ctxIdxOffset may indicate a minimum value among other context index values according to the initialization type.

For example, referring to Table 10 described above, ctxInc for the bin 0 of the MPM index may be derived as 0, ctxInc for the bin 1 may be derived as 1, and ctxInc for the bin 2 may be derived as 2. In addition, referring to Table 11 described above, in the case that the value of the initialization type is 0, ctxIdxOffset for the MPM index may be derived as 0, in the case that the value of the initialization type is 1, ctxIdxOffset for the MPM index may be derived as 3, and in the case that the value of the initialization type is 2, ctxIdxOffset for the MPM index may be derived as 6. Accordingly, in the case that the value of the initialization type is 0, the context index for the bin 0 of the MPM index may be derived as 0, the context index for the bin 1 may be derived as 1, and the context index for the bin 2 may be derived as 2. Therefore, in the case that the value of the initialization type is 0, the context index for the bin 0 of the MPM index may be derived as context model 1, the context model for the bin 1 may be derived as context model 1, and the context model for the bin 2 may be derived as context model 2. In addition, in the case that the value of the initialization type is 1, the context index for the bin 0 of the

TABLE 13

| Initialization | ctxIdx of prev_intra_luma_pred_flag | | |
|---|---|---|---|
| variable | 0 | 1 | 2 |
| initValue | 184 | 154 | 183 |

Referring to Table 13, in the case that the context index value of the MPM flag is 0, an initial value of the context model of the MPM flag may be 184, in the case that the context index value is 1, an initial value of the context model of the MPM flag may be 154, and in the case that the context index value is 2, an initial value of the context model of the MPM flag may be 183.

In addition, the context model of the MPM index, that is, the initial value according to the context index value may be derived as represented in the Table below.

TABLE 14

| Initialization | ctxIdx of mpm_idx | | | | | | | | |
|---|---|---|---|---|---|---|---|---|---|
| variable | 0 | 1 | 2 | 3 | 4 | 5 | 6 | 7 | 8 |
| initValue | 154 | 154 | 154 | 154 | 154 | 154 | 154 | 154 | 154 |

MPM index may be derived as 3, the context index for the bin 1 of the MPM index may be derived as 4, and the context index for the bin 2 of the MPM index may be derived as 5. Accordingly, in the case that the value of the initialization type is 0, the context model for the bin 0 of the MPM index may be derived as context model 3, the context model for the bin 1 of the MPM index may be derived as context model 4, and the context model for the bin 2 of the MPM index may be derived as context model 5. Furthermore, in the case that the value of the initialization type is 2, the context index for the bin 0 of the MPM index may be derived as 6, the context index for the bin 1 of the MPM index may be derived as 7, and the context index for the bin 2 of the MPM index may be derived as 8. Accordingly, in the case that the value of the initialization type is 0, the context model for the bin 0 of the MPM index may be derived as context model 6, the context index for the bin 1 of the MPM index may be derived as context model 7, and the context index for the bin 2 of the MPM index may be derived as context model 8.

The context model of the MPM flag, that is, the initial value according to the context index value may be derived as represented in the Table below.

Referring to Table 14, in the case that the context index value of the MPM index is one of 0 to 8, an initial value of the context model of the MPM index may be 154.

Meanwhile, as represented in Table 10 described above, ctxInc for a syntax element may be allocated, but another example may be proposed. For example, ctxInc for a syntax element of the MPM flag, the MPM index and the remaining intra prediction information having bins coded based on context may be allocated as represent in the Table below.

TABLE 15

| | binIdx | | | | | |
|---|---|---|---|---|---|---|
| Syntax element | 0 | 1 | 2 | 3 | 4 | >=5 |
| ... | ... | ... | ... | ... | ... | ... |
| prev_intra_luma_pred_flag[ ][ ] | 0 | na | na | na | na | na |
| mpm_idx[ ][ ] | 0 ... 2 | | | bypass | bypass | na |
| rem_intra_luma_pred_mode[ ][ ] | na | na | na | na | na | na |
| ... | ... | ... | ... | ... | ... | ... |

Herein, prev_intra_luma_pred_flag[ ][ ] may be a syntax element representing the MPM flag, mpm_idx[ ][ ] may be a syntax element representing the MPM index, and rem_intra_luma_pred_mode[ ][ ] may be a syntax element representing the remaining intra prediction information. In addition, binIdx may represent a bin index of a syntax element.

Referring to Table 15, bin 0, bin 1 and bin 2 of the MPM flag may be coded based on the context model, and ctxInc for the bin 0 may be derived as 0. In addition, referring to Table 15, bin 0, bin 1 and bin 2 of the MPM index may be coded based on the context model. For example, ctxInc for the bin 0 of the MPM index may be derived as 0, ctxInc for the bin 1 may be derived as 1, and ctxInc for the bin 2 may be derived as 2. Meanwhile, a bypass coding may be applied to bin 3 and bin 4 of the MPM index. The bypass coding may represent a coding method by applying a uniform probability distribution (e.g., 50:50) instead of applying the context model having a specific probability distribution.

Figure 14:
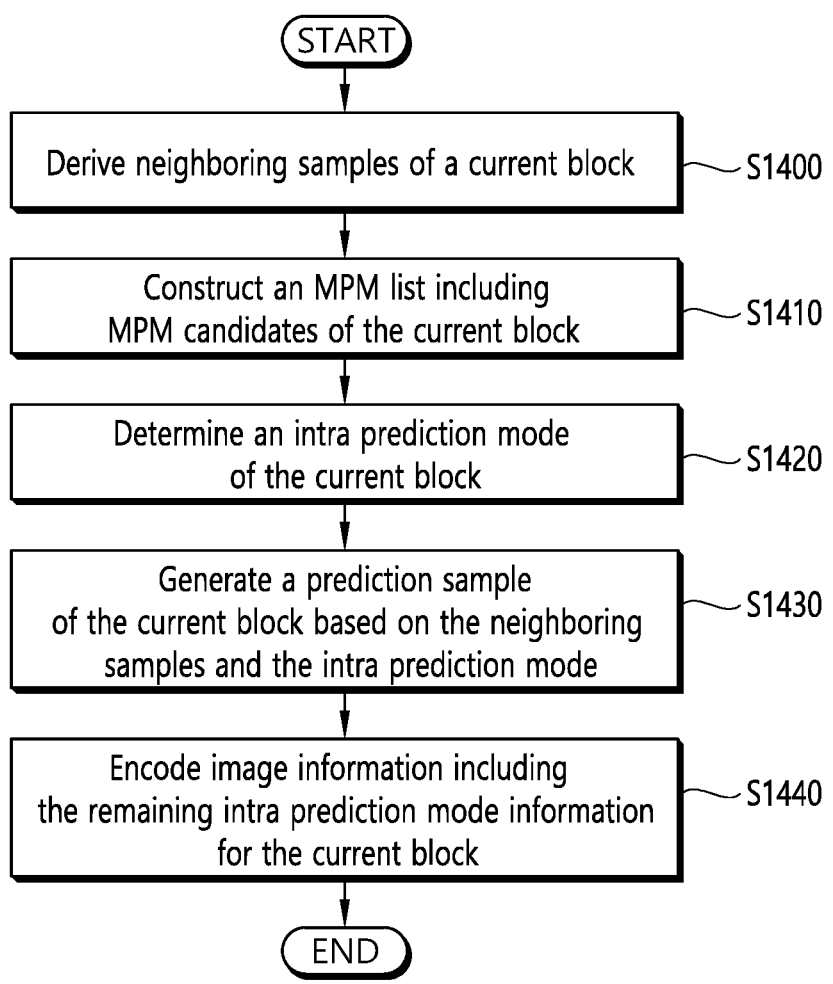
FIG. 14 illustrates an image encoding method by an encoding device according to the present disclosure.

FIG. 14 illustrates an image encoding method by an encoding device according to the present disclosure. The method disclosed in FIG. 14 may be performed by the encoding device shown in FIG. 1. Particularly, for example, steps S1400 to S1430 of FIG. 14 may be performed by the predictor of the encoding device, and step S1440 may be performed by the entropy encoder of the encoding device. In addition, although it is not shown, the process of deriving a residual sample for a current block based on the original sample and the prediction sample of the current block may be performed by the subtractor of the encoding device, the process of generating information for residual for the current block based on the residual sample may be performed by the transformer of the encoding device, and the process of encoding the information for residual may be performed by the entropy encoder of the encoding device.

The encoding device derives neighboring samples of a current block (step, S1400). The neighboring samples may include an upper left neighboring sample, an upper neighboring sample and a left neighboring sample of the current block. For example, in the case that a size of the current block is W×H and x component of top left sample position of the current block is 0 and y component is 0, the left neighboring samples may be p[−1][0] to p[−1][2H−1], the upper left corner neighboring samples may be p[−1][−1] and the upper neighboring samples may be p[0][−1] to p[2W−1][−1].

The encoding device constructs an MPM list including Most Probable Mode (MPM) candidates of the current block (step, S1410). Here, for example, the MPM list may include 3 MPM candidates, 5 MPM candidates or 6 MPM candidates.

For example, the encoding device may construct the MPM list of the current block based on a neighboring block of the current block, and the MPM list may include 6 MPM candidates. The neighboring block may include the left neighboring block, the upper neighboring block, the lower left neighboring block, the upper right neighboring block and/or the upper left neighboring block of the current block. The encoding device may search the neighboring blocks of the current block according to a specific order and derive intra prediction mode of the neighboring block as the MPM candidates according to the deriving order. For example, the encoding device may derive the MPM candidate and construct the MPM list of the current block by searching in the order of the intra prediction mode of the left neighboring block, the intra prediction mode of the upper neighboring block, the planar intra prediction mode, the DC intra prediction mode, the intra prediction mode of the lower left neighboring block, the intra prediction mode of the upper right neighboring block and the intra prediction mode of the upper left neighboring block. Meanwhile, after searching, in the case that 6 MPM candidates are not derived, the MPM candidate may be derived based on the intra prediction mode which is derived as the MPM candidate. For example, in the case that the intra prediction mode which is derived as the MPM candidate is #N intra prediction mode, the encoding device may derive #N+1 and/or #N−1 intra prediction mode as the MPM candidate of the current block.

The encoding device determines an intra prediction mode of the current block (step, S1420). The encoding device may perform various intra prediction modes and derive the intra prediction mode having an optimal RD cost as the intra prediction mode for the current block. The intra prediction mode may be one of 2 non-directional intra prediction modes and 65 directional intra prediction modes. As described above, the 2 non-directional intra prediction modes may include the intra DC mode and the intra planar mode.

For example, the intra prediction mode may be one of the remaining intra prediction modes except the MPM candidates. Here, the remaining intra prediction modes may be intra prediction modes except the MPM candidates included in the MPM list in the total intra prediction modes. In addition, in this case, the encoding device may encode the remaining intra prediction mode information indicating the intra prediction mode of the current block.

In addition, for example, the encoding device may select the MPM candidate having an optimal RD cost among the MPM candidates of the MPM list and determine the selected MPM candidate as the intra prediction mode of the current block. In this case, the encoding device may encode the MPM index indicating the selected MPM candidate among the MPM candidates.

The encoding device generates a prediction sample of the current block based on the neighboring samples and the intra prediction mode (step, S1430). The encoding device may derive at least one neighboring sample among the neighboring samples of the current block and generate the prediction sample based on the neighboring sample.

The encoding device encodes image information including the remaining intra prediction mode information for the current block (step, S1440). The encoding device may output the image information including the remaining intra prediction mode information for the current block as a bitstream format. The remaining intra prediction mode information may be signaled in the form of rem_intra_luma_pred_mode or intra_luma_mpm_remainder syntax element.

In addition, as an example, the remaining intra prediction mode information may be coded through the Truncated Binary (TB) binarization process. The binarization parameter for the TB binarization process may be pre-configured. For example, the binarization parameter value may be 60 or 61. That is, as an example, the parameter value may be the number of total intra prediction modes minus the number of MPM candidates minus 1. Here, the binarization parameter may indicate c Max described above. The binarization parameter may represent a maximum value of the remaining intra prediction mode information which is coded. That is, the binarization parameter indicate a maximum value indicated by the remaining intra prediction mode information which is coded.

As described above, the remaining intra prediction mode information may be coded through the TB binarization process. Accordingly, in the case that a value of the remaining intra prediction mode information is smaller than a specific value, the remaining intra prediction mode information may be binarized with a binarization value of k+1 bit. The specific value and the k may be derived based on the binarization parameter. For example, the specific value and the k may be derived based on Equation 3 described above. As an example, in the case that the binarization parameter value is 60, the specific value may be derived as 3, and the k may be derived as 5.

Meanwhile, the intra prediction mode of the current block is one of the remaining intra prediction modes, the encoding device may encode the remaining intra prediction mode information for the current block. That is, in the case that the intra prediction mode of the current block is one of remaining intra prediction modes, the image information may include the remaining intra prediction mode information. The remaining intra prediction mode information may indicate the intra prediction mode information of the current block among the remaining intra prediction modes. Here, the remaining intra prediction modes may indicate the remaining intra prediction modes which are not included in the MPM candidates of the MPM list.

In addition, for example, the image information may include Most Probable Mode (MPM) flag for the current block. The MPM flag may indicate that the intra prediction mode of the current block is included in the MPM candidates or included in the remaining intra prediction modes which are not included in the MPM candidates. That is, the MPM flag may indicate whether the intra prediction mode of the current block is derived from the MPM candidates. Particularly, in the case that the MPM flag value is 1, the MPM flag may indicate that the intra prediction mode of the current block is included in the MPM candidates, and in the case that the MPM flag value is 0, the MPM flag may indicate that the intra prediction mode of the current block is not included in the MPM candidates, that is, included in the remaining intra prediction modes. The MPM flag may be signaled in the form of prev_intra_luma_pred_flag or intra_luma_mpm_flag syntax element.

Alternatively, in the case that the intra prediction mode of the current block is included in the MPM candidates, the encoding device may not encode the MPM flag. That is, in the case that the intra prediction mode of the current block is included in the MPM candidates, the intra prediction information may not include the MPM flag.

Meanwhile, the MPM flag may be coded based on the context model. For example, the context model for the MPM flag may be derived based on an initialization type of the current slice. For example, the initialization type may be derived as represented in Table 12 described above. In addition, in the case that the context index of the context model is 0, the initial value of the context value may be 184, in the case that the context index of the context model is 1, the initial value of the context value may be 154, and in the case that the context index of the context model is 2, the initial value of the context value may be 183.

In the case that the intra prediction mode of the current block is included in the MPM candidates, the encoding device may encode the MPM index. That is, in the case that the intra prediction mode of the current block is included in the MPM candidates, the intra prediction information of the current block may include the MPM index. The MPM index may represent an MPM index indicating one of the MPM candidates of the MPM list. The MPM index may be signaled in the form of mpm_idx or intra_luma_mpm_idx syntax element.

Meanwhile, for example, the MPM index may be binarized through Truncated Rice (TR) binarization process. The binarization parameter for the TR binarization process may be pre-configured. Alternatively, for example, the binarization parameter value may be configured as the number of MPM candidates minus 1. In the case that the number of MPM candidates is 6, the binarization parameter may be configured as 5. Here, the binarization parameter may represent the c Max described above. The binarization parameter may represent a maximum value of the MPM index which is coded. In addition, cRiceParam for the TR binarization process may be pre-configured as 0.

In addition, the MPM index may be coded based on the context model.

In this case, for example, based on the $N^{th}$ MPM candidate included in the MPM list, the context model for the $N^{th}$ bin for the MPM index may be derived.

The context model for the $N^{th}$ bin derived based on the $N^{th}$ MPM candidate may be as below.

As an example, in the case that the intra prediction mode represented by the $N^{th}$ MPM candidate is DC intra prediction mode or planar intra prediction mode, the context model for the $N^{th}$ bin may be derived as context model 1, in the case that the intra prediction mode represented by the $N^{th}$ MPM candidate is not DC intra prediction mode and planar intra prediction mode but #2 intra prediction mode to #34 intra prediction mode, the context model for the $N^{th}$ bin may be derived as context model 2, and in the case that the intra prediction mode represented by the $N^{th}$ MPM candidate is not DC intra prediction mode and planar intra prediction mode and not #2 intra prediction mode to #34 intra prediction mode but #35 intra prediction mode to #66 intra prediction mode, the context model for the $N^{th}$ bin may be derived as context model 3.

Alternatively, as an example, in the case that the intra prediction mode represented by the $N^{th}$ MPM candidate is planar intra prediction mode, the context model for the $N^{th}$ bin may be derived as context model 1, in the case that the intra prediction mode represented by the $N^{th}$ MPM candidate is not planar intra prediction mode but DC intra prediction mode, the context model for the $N^{th}$ bin may be derived as context model 2, in the case that the intra prediction mode represented by the $N^{th}$ MPM candidate is not DC intra prediction mode and planar intra prediction mode but #2 intra prediction mode to #34 intra prediction mode, the context model for the $N^{th}$ bin may be derived as context model 3, and in the case that the intra prediction mode represented by the $N^{th}$ MPM candidate is not DC intra prediction mode and planar intra prediction mode and not #2 intra prediction mode to #34 intra prediction mode but #35 intra prediction mode to #66 intra prediction mode, the context model for the $N^{th}$ bin may be derived as context model 4.

Alternatively, as an example, the context model for the $N^{th}$ bin of the MPM index may be derived based on a bin index of the $N^{th}$ bin and an initialization type of the current slice. For example, the context index of the context model for the $N^{th}$ bin may be derived as a sum of ctxInc and ctxIdxOffset. In addition, in the case that the bin index of the $N^{th}$ bin is 0, the ctxInc may be derived as 1, and in the case that the bin index of the $N^{th}$ bin is 2, the ctxInc may be derived as 2. Further, in the case that the initialization type value is 0, the ctxIdxOffset may be derived as 0, in the case that the initialization type value is 1, the ctxIdxOffset may be derived as 3, and in the case that the initialization type value is 2, the ctxIdxOffset may be derived as 6. Meanwhile, the initial value of the context model may be derived as 154.

Meanwhile, as an example, the encoding device may derive a residual sample for the current block based on an original sample and a prediction sample for the current block, generate information for a residual for the current block based on the residual sample, and encode the information for a residual.

Meanwhile, the bitstream may be transmitted to the decoding device through a network or a (digital) storage medium. Here, the network may include a broadcast network and/or a communication network. The digital storage medium may include various storage medium such as USB, SD, CD, DVD, blue-ray disk, HDD and SSD.

Figure 15:
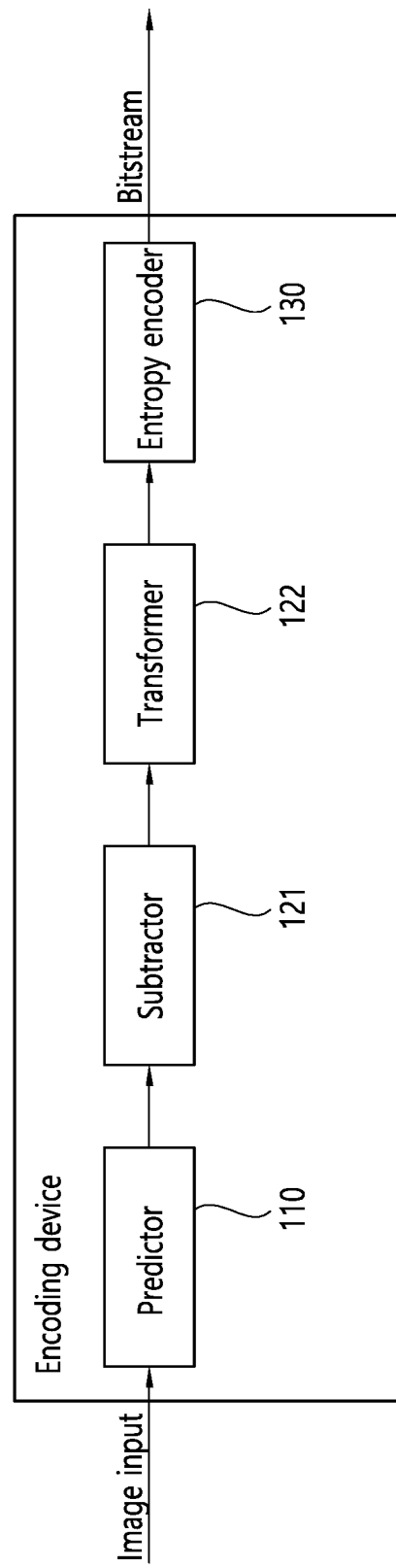
FIG. 15 schematically illustrates an encoding device performing an image encoding method according to the present disclosure.

FIG. 15 schematically illustrates an encoding device performing an image encoding method according to the present disclosure. The method disclosed in FIG. 14 may be performed by the encoding device shown in FIG. 15. Particularly, for example, the predictor of the encoding device of FIG. 15 may perform steps S1400 to S1430 of FIG. 14, and the entropy encoder of the encoding device of FIG. 15 may perform step S1440 of FIG. 14. In addition, although it is not shown, the process of deriving a residual sample for a current block based on the original sample and the prediction sample of the current block may be performed by the subtractor of the encoding device of FIG. 15, the process of generating information for residual for the current block based on the residual sample may be performed by the transformer of the encoding device of FIG. 15, and the process of encoding the information for residual may be performed by the entropy encoder of the encoding device of FIG. 15.

Figure 16:
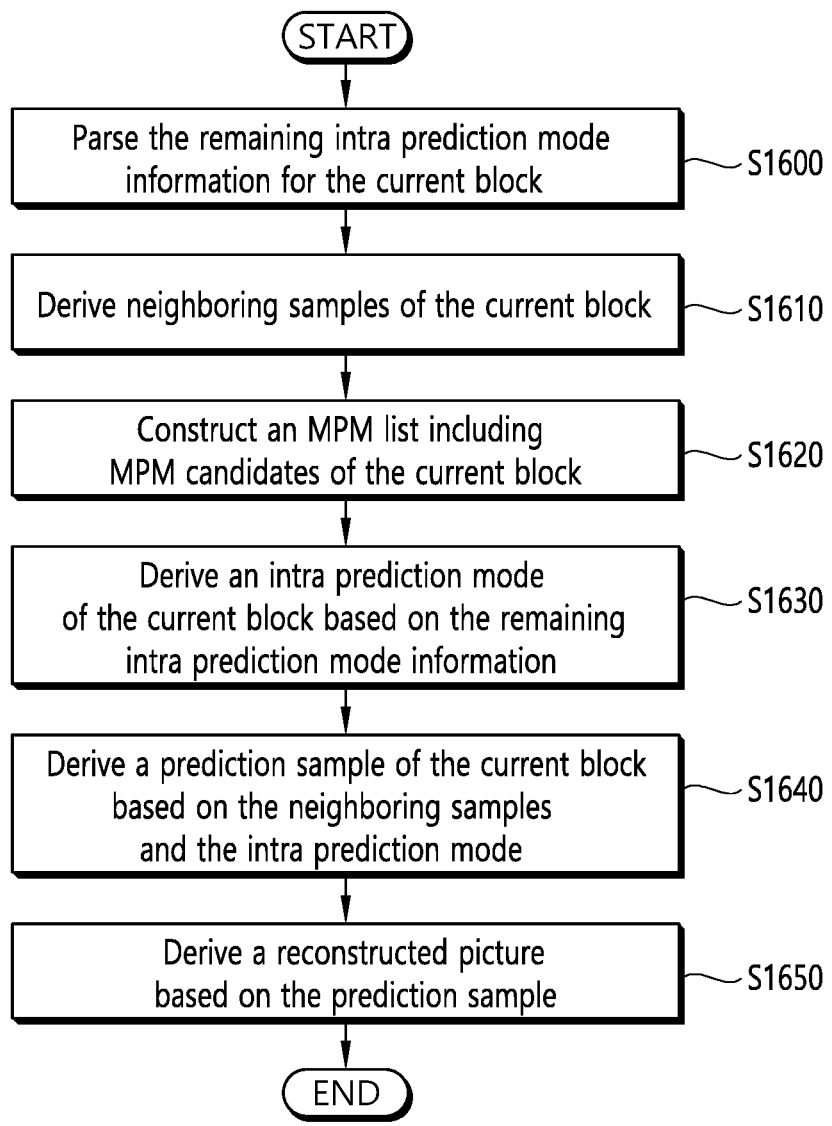
FIG. 16 illustrates an image decoding method by a decoding device according to the present disclosure.

FIG. 16 illustrates an image decoding method by a decoding device according to the present disclosure. The method disclosed in FIG. 16 may be performed by the decoding device shown in FIG. 3. Particularly, for example, step S1600 of FIG. 16 may be performed by the entropy decoder of the decoding device, and steps S1610 to S1650 may be performed by the predictor of the decoding device. In addition, although it is not shown, the process of obtaining information for a prediction of a current block through a bitstream and/or information for a residual may be performed by the entropy decoder of the decoding device, the process of deriving the residual sample for the current block based on the residual information may be performed by the inverse transformer of the decoding device, and the process of generating a reconstructed picture based on the prediction sample and the residual sample of the current block may be performed by the adder of the decoding device.

The decoding device parses the remaining intra prediction mode information for the current block (step, S1600). The decoding device may obtain image information including the remaining intra prediction mode information for the current block and parse the remaining intra prediction mode information.

For example, the image information may include the remaining intra prediction mode information representing one of the remaining intra prediction modes except the MPM candidates of the current block. In this case, the decoding device may derive the intra prediction mode indicated by the remaining intra prediction mode information as the intra prediction mode of the current block. Here, the remaining intra prediction modes may indicate the remaining intra prediction modes which are not included in the MPM candidates of the MPM list. The remaining intra prediction mode information may be signaled in the form of rem_intra_luma_pred_mode or intra_luma_mpm_remainder syntax element.

In addition, as an example, the remaining intra prediction mode information may be coded through the Truncated Binary (TB) binarization process. The binarization parameter for the TB binarization process may be pre-configured. For example, the binarization parameter value may be 60 or 61. That is, as an example, the parameter value may be the number of total intra prediction modes minus the number of MPM candidates minus 1. Here, the binarization parameter may indicate cMax described above. The binarization parameter may represent a maximum value of the remaining intra prediction mode information which is coded. That is, the binarization parameter indicate a maximum value indicated by the remaining intra prediction mode information which is coded.

As described above, the remaining intra prediction mode information may be coded through the TB binarization process. Accordingly, in the case that a value of the remaining intra prediction mode information is smaller than a specific value, the remaining intra prediction mode information may be binarized with a binarization value of k+1 bit. The specific value and the k may be derived based on the binarization parameter. For example, the specific value and the k may be derived based on Equation 3 described above. As an example, in the case that the binarization parameter value is 60, the specific value may be derived as 3, and the k may be derived as 5.

Meanwhile, the image information may include a Most Probable Mode (MPM) flag of the current block. That is, for example, the MPM flag of the current block may be obtained, and the MPM flag may indicate whether the intra prediction mode of the current block is derived from the MPM candidates.

As an example, in the case that MPM flag indicates that the intra prediction mode of the current block is derived from the MPM candidates, that is, in the case that the MPM flag value is 1, the decoding device may obtain an MPM index for the current block from a bitstream. That is, in the case that the MPM flag value is 1, the image information may include the MPM index. Alternatively, the image information may not include the MPM flag. In this case, the decoding device may derive the MPM flag value as 1. The MPM index may indicate an MPM index indicating one of the MPM candidates of the MPM list. The MPM index may be signaled in the form of mpm_idx or intra_luma_mpm_idx syntax element.

In addition, in the case that MPM flag indicates that the intra prediction mode of the current block is not derived from the MPM candidates, that is, in the case that the MPM flag value is 0, the intra prediction mode of the current block may be derived based on the remaining intra prediction mode information. That is, in the case that MPM flag indicates that the intra prediction mode of the current block is not derived from the MPM candidates, the decoding device may parse the remaining intra prediction mode information for the current block from a bitstream. That is, in the case that the MPM flag value is 0, the image information may include the remaining intra prediction mode information indicating one of the remaining intra prediction modes.

Meanwhile, the MPM flag may be coded based on the context model. For example, the context model for the MPM flag may be derived based on an initialization type of the current slice. For example, the initialization type may be derived as represented in Table 12 described above. In addition, in the case that the context index of the context model is 0, the initial value of the context value may be 184, in the case that the context index of the context model is 1, the initial value of the context value may be 154, and in the case that the context index of the context model is 2, the initial value of the context value may be 183.

Meanwhile, for example, the MPM index may be binarized through Truncated Rice (TR) binarization process. The binarization parameter for the TR binarization process may be pre-configured. Alternatively, for example, the binarization parameter value may be configured as the number of MPM candidates minus 1. In the case that the number of MPM candidates is 6, the binarization parameter may be configured as 5. Here, the binarization parameter may represent the cMax described above. The binarization parameter may represent a maximum value of the MPM index which is coded. In addition, cRiceParam for the TR binarization process may be pre-configured as 0.

In addition, the MPM index may be coded based on the context model.

In this case, for example, based on the $N^{th}$ MPM candidate included in the MPM list, the context model for the $N^{th}$ bin for the MPM index may be derived.

The context model for the $N^{th}$ bin derived based on the $N^{th}$ MPM candidate may be as below.

As an example, in the case that the intra prediction mode represented by the $N^{th}$ MPM candidate is DC intra prediction mode or planar intra prediction mode, the context model for the $N^{th}$ bin may be derived as context model 1, in the case that the intra prediction mode represented by the $N^{th}$ MPM candidate is not DC intra prediction mode and planar intra prediction mode but #2 intra prediction mode to #34 intra prediction mode, the context model for the $N^{th}$ bin may be derived as context model 2, and in the case that the intra prediction mode represented by the $N^{th}$ MPM candidate is not DC intra prediction mode and planar intra prediction mode and not #2 intra prediction mode to #34 intra prediction mode but #35 intra prediction mode to #66 intra prediction mode, the context model for the $N^{th}$ bin may be derived as context model 3.

Alternatively, as an example, in the case that the intra prediction mode represented by the $N^{th}$ MPM candidate is planar intra prediction mode, the context model for the $N^{th}$ bin may be derived as context model 1, in the case that the intra prediction mode represented by the $N^{th}$ MPM candidate is not planar intra prediction mode but DC intra prediction mode, the context model for the $N^{th}$ bin may be derived as context model 2, in the case that the intra prediction mode represented by the $N^{th}$ MPM candidate is not DC intra prediction mode and planar intra prediction mode but #2 intra prediction mode to #34 intra prediction mode, the context model for the $N^{th}$ bin may be derived as context model 3, and in the case that the intra prediction mode represented by the $N^{th}$ MPM candidate is not DC intra prediction mode and planar intra prediction mode and not #2 intra prediction mode to #34 intra prediction mode but #35 intra prediction mode to #66 intra prediction mode, the context model for the $N^{th}$ bin may be derived as context model 4.

Alternatively, as an example, the context model for the $N^{th}$ bin of the MPM index may be derived based on a bin index of the $N^{th}$ bin and an initialization type of the current slice. For example, the context index of the context model for the $N^{th}$ bin may be derived as a sum of ctxInc and ctxIdxOffset. In addition, in the case that the bin index of the $N^{th}$ bin is 0, the ctxInc may be derived as 1, and in the case that the bin index of the $N^{th}$ bin is 2, the ctxInc may be derived as 2. Further, in the case that the initialization type value is 0, the ctxIdxOffset may be derived as 0, in the case that the initialization type value is 1, the ctxIdxOffset may be derived as 3, and in the case that the initialization type value is 2, the ctxIdxOffset may be derived as 6. Meanwhile, the initial value of the context model may be derived as 154.

The decoding device derives neighboring samples of the current block (step, S1610). The neighboring samples may include an upper left neighboring sample, an upper neighboring sample and a left neighboring sample of the current block. For example, in the case that a size of the current block is W×H and x component of top left sample position of the current block is 0 and y component is 0, the left neighboring samples may be p[−1][0] to p[−1][2H−1], the upper left corner neighboring samples may be p[−1][−1] and the upper neighboring samples may be p[0][−1] to p[2W−1][−1].

The decoding device constructs an MPM list including Most Probable Mode (MPM) candidates of the current block (step, S1620). For example, the decoding device may construct Most Probable Mode (MPM) list of the current block based on a neighboring block of the current block. Here, for example, the MPM list may include 3 MPM candidates, 5 MPM candidates or 6 MPM candidates.

For example, the decoding device may construct the MPM list of the current block based on a neighboring block of the current block, and the MPM list may include 6 MPM candidates. The neighboring block may include the left neighboring block, the upper neighboring block, the lower left neighboring block, the upper right neighboring block and/or the upper left neighboring block of the current block. The decoding device may search the neighboring blocks of the current block according to a specific order and derive intra prediction mode of the neighboring block as the MPM candidates according to the deriving order. For example, the decoding device may derive the MPM candidate and construct the MPM list of the current block by searching in the order of the intra prediction mode of the left neighboring block, the intra prediction mode of the upper neighboring block, the planar intra prediction mode, the DC intra prediction mode, the intra prediction mode of the lower left neighboring block, the intra prediction mode of the upper right neighboring block and the intra prediction mode of the upper left neighboring block. Meanwhile, after searching, in the case that 6 MPM candidates are not derived, the MPM candidate may be derived based on the intra prediction mode which is derived as the MPM candidate. For example, in the case that the intra prediction mode which is derived as the MPM candidate is #N intra prediction mode, the encoding device may derive #N+1 and/or #N−1 intra prediction mode as the MPM candidate of the current block.

The decoding device derives an intra prediction mode of the current block based on the remaining intra prediction mode information (step, S1630). The decoding device may derive the intra prediction mode indicated by the remaining intra prediction mode information as the intra prediction mode of the current block. The remaining intra prediction mode information may represent one of the remaining intra prediction modes. The intra prediction mode may be one of the remaining intra prediction modes except the MPM candidates.

Meanwhile, as an example, in the case that a value of the remaining intra prediction mode information is N, the remaining intra prediction mode information may indicate #N intra prediction mode.

In addition, as another example, in the case that a value of the remaining intra prediction mode information is N, the remaining intra prediction mode information may indicate the N+1th intra prediction mode in an intra mode map. The intra mode map may represent the intra prediction modes except the MPM candidates from the intra prediction modes of a pre-configured order. For example, the intra prediction modes of a pre-configured order may be represented as below.

{0, 1, 50, 18, 49, 10, 12, 19, 11, 34, 2, 17, 54, 33, 46, 51, 35, 15, 13, 45, 22, 14, 66, 21, 47, 48, 23, 53, 58, 16, 42, 20, 24, 44, 26, 43, 55, 52, 37, 29, 39, 41, 25, 9, 38, 56, 30, 36, 32, 28, 62, 27, 40, 8, 3, 7, 57, 6, 31, 4, 65, 64, 5, 59, 60, 61, 63}

In addition, as another example, in the case that a value of the remaining intra prediction mode information is N, the remaining intra prediction mode information may indicate the N+1$^{th}$ intra prediction mode in TBC list. The TBC list may be constructed with the intra prediction modes derived based on a directional intra prediction mode and an offset among the MPM candidates.

Meanwhile, in the case that the MPM flag value is 1, the decoding device may obtain an MPM index for the current block from a bitstream and derive an intra prediction mode of the current block based on the MPM index. The decoding device may derive the MPM candidate indicated by the MPM index as the intra prediction mode of the current block. The MPM index may indicate one of the MPM candidate of the MPM list.

The decoding device derives a prediction sample of the current block based on the neighboring samples and the intra prediction mode (step, S1640). The decoding device may derive at least one neighboring sample among the neighboring samples of the current block based on the intra prediction mode and generate the prediction sample based on the neighboring sample.

The decoding device derives a reconstructed picture based on the prediction sample (step, S1650). The decoding device may use the prediction sample as a reconstructed sample directly according to a prediction mode or generate a reconstructed sample by adding the prediction sample to a residual sample. In the case that a residual sample for the current block is present, the decoding device may receive information for a residual for the current block, and the information for a residual may be included in information for the face. The information for a residual may include a transform coefficient for the residual sample. The image information may include the information for a residual. The decoding device may derive the residual sample (or residual sample array) for the current block based on the residual information. The decoding device may generate a reconstructed sample based on the prediction sample and the residual sample and derive a reconstructed block or a reconstructed picture based on the reconstructed sample.

Meanwhile, later, the decoding device may apply deblocking filtering and/or in-loop filtering procedure such as SAO procedure to the reconstructed picture to improve subjective or objective image quality as occasion demands, as described above.

Figure 17:
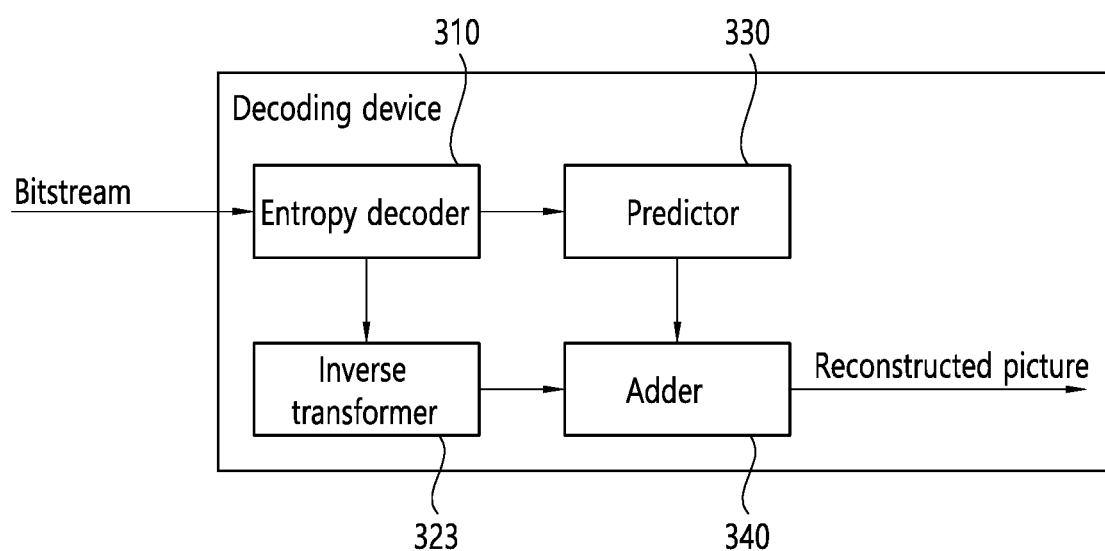
FIG. 17 illustrates a decoding device performing an image decoding method according to the present disclosure.

FIG. 17 illustrates a decoding device performing an image decoding method according to the present disclosure. The method disclosed in FIG. 16 may be performed by the decoding device shown in FIG. 17. Particularly, for example, the entropy decoder of the decoding device may perform step S1600 of FIG. 16, and the predictor of the decoding device may perform steps S1610 to S1650 of FIG. 16. In addition, although it is not shown, the process of obtaining image information including information for a residual of the current block through a bitstream may be performed by the entropy decoder of the decoding device of FIG. 17, the process of deriving the residual sample for the current block based on the residual information may be performed by an inverse transformer of the decoding device of FIG. 17, and the process of generating a reconstructed picture based on the prediction sample and the residual sample may be performed by the adder of the decoding device of FIG. 17.

According to the present disclosure described above, information representing an intra-prediction of a current block may be coded based on a truncated binary code which is a variable binary code, and through this, signaling overhead of the information for representing an intra-prediction mode may be reduced, and overall coding efficiency can be improved.

In addition, according to the present disclosure, an intra-prediction mode of which selection probability is high may be represented by information of a value corresponding to a binary code of a small bit, and through this, signaling overhead of intra-prediction information may be reduced, and overall coding efficiency can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding device and the encoding device to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 18:
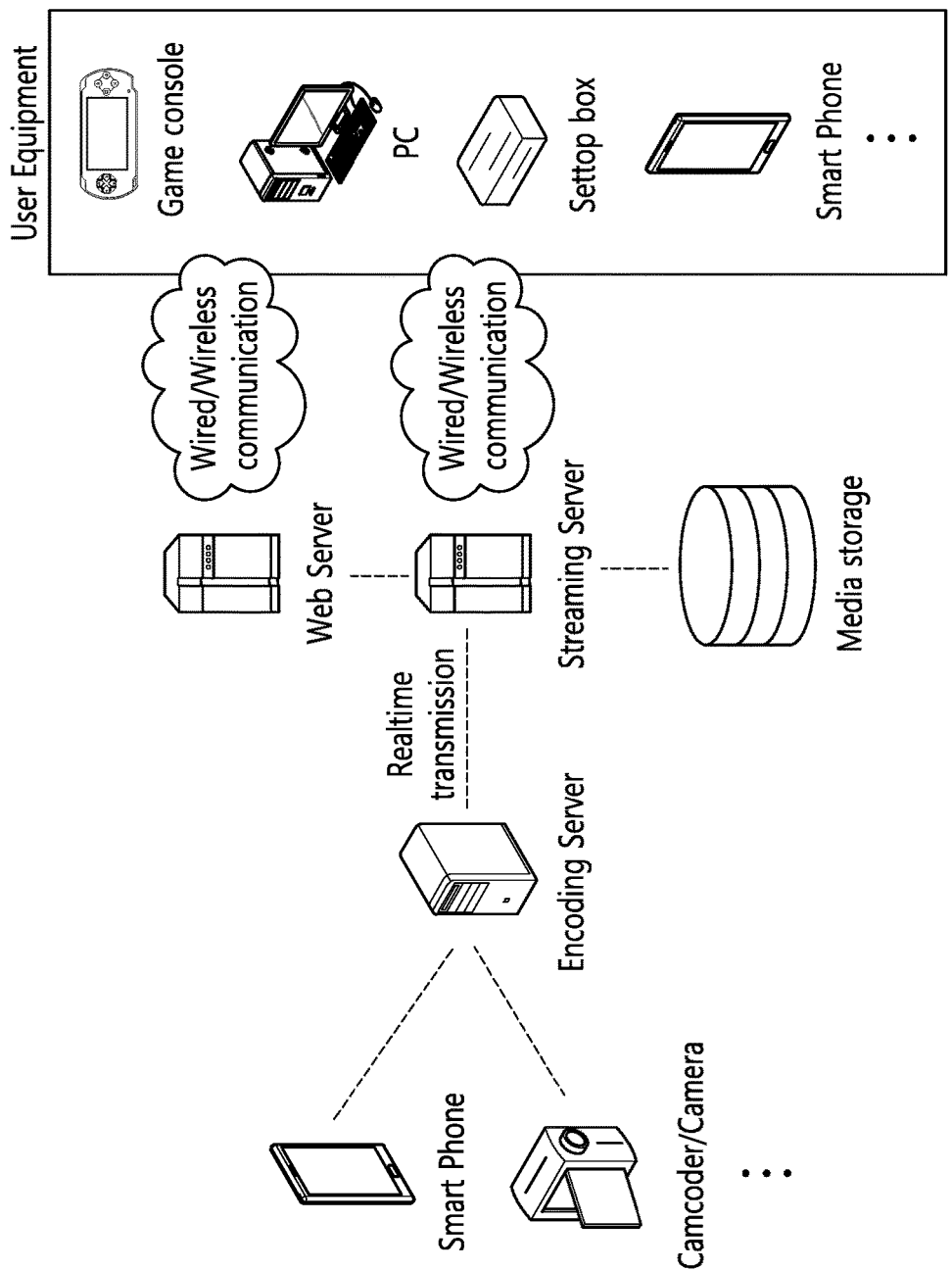
FIG. 18 illustrates a structural diagram of a contents streaming system to which the present disclosure is applied.

FIG. 18 illustrates a structural diagram of a contents streaming system to which the present disclosure is applied.

The contents streaming system to which the present disclosure may include an encoding server, a streaming server, a web server, a media storage, a user device and a multimedia input device, largely.

The encoding server performs the role of generating a bitstream by compressing input contents from multimedia input devices such as a smart phone, a camera, a camcorder, and the like to digital data and transmitting it to the streaming server. As another example, in the case that the multimedia input devices such as a smart phone, a camera, a camcorder, and the like generate a bitstream directly, the encoding server may be omitted.

The bitstream may be generated by the encoding method or the bitstream generation method to which the present disclosure is applied, and the streaming server may store the bitstream temporally during the process of transmitting and receiving the bitstream.

The streaming server performs the role of transmitting multimedia data to a user device based on a user request through a web server, and the web server performs the role of a medium that informs which type of service is present to the user. When the user requests a desired service to the web server, the web server transfer it to the streaming server, and the streaming server transmit the multimedia data to the user. At this time, the contents streaming system may be included in a separate control server, and this this case, the control server performs the role of controlling a command/response between devices in the contents streaming system.

The streaming server may receive contents from a media storage and/or an encoding server. For example, in the case that the streaming server receives contents from the encoding server, the streaming server may receive the contents in real time. In this case, to provide smooth streaming service, the streaming server may store the bitstream during a predetermined time.

An example of the user device may include a mobile phone, a smart phone, a laptop computer, a digital broadcasting terminal, a personal digital assistant (PDA), a portable multimedia player (PMP), a navigation, a slate PC, a tablet PC, an ultra-book, a wearable device such as a smartwatch, a smart glass, a head mounted display (HMD), a digital TV, a desktop computer, a digital signage, and the like.

Each of the servers in the contents streaming system may be operated in a distributed server, and in this case, data received in each server may be processed in distributed manner.

What is claimed is:

1. An image decoding method performed by a decoding device, the method comprising:
    parsing remaining intra prediction mode information and residual information for a current block;
    deriving neighboring samples of the current block;
    deriving most probable mode (MPM) list including MPM candidates of the current block;
    rearranging remaining intra prediction modes excluding the MPM candidates based on a pre-configured order;
    deriving an intra prediction mode of the current block based on the remaining intra prediction mode information and the rearranged remaining intra prediction modes, wherein the intra prediction mode is an intra prediction mode indicated by the remaining intra prediction mode information among the rearranged remaining intra prediction modes;
    deriving a prediction sample of the current block based on the intra prediction mode and the neighboring samples;
    deriving a residual sample of the current block based on the residual information; and
    deriving a reconstructed picture based on the prediction sample and the residual sample,
    wherein the remaining intra prediction mode information is bypass coded based on a truncated binary (TB) binarization process, and
    wherein a binarization parameter for the TB binarization process is 60,
    wherein the remaining intra prediction mode information equal to one of 0 to 2 is binarized with a binarization value of 5 bits, and
    wherein the remaining intra prediction mode information equal to one of 3 to 60 is binarized with a binarization value of 6 bits,
    based on a value of the remaining intra prediction mode information being N, an N+1th intra prediction mode among the rearranged remaining intra prediction modes is derived as the intra prediction mode of the current block, and
    the pre-configured order is as below:
    {0, 1, 50, 18, 49, 10, 12, 19, 11, 34, 2, 17, 54, 33, 46, 51, 35, 15, 13, 45, 22, 14, 66, 21, 47, 48, 23, 53, 58, 16, 42, 20, 24, 44, 26, 43, 55, 52, 37, 29, 39, 41, 25, 9, 38, 56, 30, 36, 32, 28, 62, 27, 40, 8, 3, 7, 57, 6, 31, 4, 65, 64, 5, 59, 60, 61, 63}.

2. The image decoding method of claim 1, wherein an MPM flag of the current block is obtained, and
    wherein the MPM flag is a flag related to whether the intra prediction mode of the current block is derived from the MPM candidates.

3. The image decoding method of claim 2, when the MPM flag indicates that the intra prediction mode of the current block is not derived from the MPM candidates, the intra prediction mode of the current block is derived based on the remaining intra prediction mode information.

4. The image decoding method of claim 2, wherein when the MPM flag indicates that the intra prediction mode of the current block is derived from the MPM candidates, a MPM index for the current block is parsed, and the intra prediction mode of the current block is derived based on the MPM index, and
    wherein the MPM index is coded based on a truncated rice (TR) binarization process, and
    wherein a rice parameter for the TR binarization process is 0.

5. The image decoding method of claim 1, wherein a specific value is derived based on the binarization parameter for the TB binarization process, and
    wherein the specific value is the number of values of the remaining intra prediction mode information binarized with a binarization value of k bits, and
    wherein when the binarization parameter for the TB binarization process is 60, the k bits is derived as 5 bits.

6. The image decoding method of claim 5, wherein the specific value and the k are derived based on Equation below, $$n = c\text{Max} + 1$$
$$k = \text{Floor}(\text{Log2}(n)) \text{ so that } 2^k <= n < 2^{k+1}$$
$$u = 2^{k+1} - n$$

wherein, c Max represents the binarization parameter, and u represents the specific value.

7. The image decoding method of claim 6, wherein the binarization parameter is a number of total intra prediction modes minus a number of MPM candidates, and minus 1.

8. The image decoding method of claim 1, wherein the neighboring samples include an upper left corner neighboring sample, upper neighboring samples and left neighboring samples of the current block,
when a size of the current block is W×H and x component of top left sample position of the current block is 0 and y component is 0, the left neighboring samples are p[−1][0] to p[−1][2H−1], the upper left corner neighboring sample is p[−1][−1] and the upper neighboring samples are p[0][−1] to p[2W−1][−1].

9. An image encoding method performed by an encoding device, the method comprising:
deriving neighboring samples of the current block;
deriving most probable mode (MPM) list including MPM candidates of the current block;
rearranging remaining intra prediction modes excluding the MPM candidates based on a pre-configured order;
determining an intra prediction mode of the current block based on the rearranged remaining intra prediction modes, wherein the intra prediction mode is one of the rearranged remaining intra prediction modes;
deriving a prediction sample of the current block based on the intra prediction mode and the neighboring samples;
deriving a residual sample of the current block based on the prediction sample; and
encoding image information including remaining intra prediction mode information and residual information for the current block,
wherein the remaining intra prediction mode information represents the intra prediction mode of the current block,
wherein the remaining intra prediction mode information is bypass coded based on a truncated binary (TB) binarization process, and
wherein a binarization parameter for the TB binarization process is 60,
wherein the remaining intra prediction mode information equal to one of 0 to 2 is binarized with a binarization value of 5 bits, and
wherein the remaining intra prediction mode information equal to one of 3 to 60 is binarized with a binarization value of 6 bits,
based on a value of the remaining intra prediction mode information being N, the remaining intra prediction mode information indicates an N+1th intra prediction mode among the rearranged remaining intra prediction modes as the intra prediction mode of the current block, and
the pre-configured order is as below:
{0, 1, 50, 18, 49, 10, 12, 19, 11, 34, 2, 17, 54, 33, 46, 51, 35, 15, 13, 45, 22, 14, 66, 21, 47, 48, 23, 53, 58, 16, 42, 20, 24, 44, 26, 43, 55, 52, 37, 29, 39, 41, 25, 9, 38, 56, 30, 36, 32, 28, 62, 27, 40, 8, 3, 7, 57, 6, 31, 4, 65, 64, 5, 59, 60, 61, 63}.

10. The image encoding method of claim 9, wherein an MPM flag of the current block is encoded, wherein the MPM flag is a flag related to whether the intra prediction mode of the current block is derived from the MPM candidates, and
wherein when the MPM flag represents that the intra prediction mode of the current block is derived from the MPM candidates, a MPM index for the current block is encoded, and the intra prediction mode of the current block is derived based on the MPM index, and wherein the MPM index is coded based on a truncated rice (TR) binarization process, and
wherein a rice parameter for the TR binarization process is 0.

11. The image encoding method of claim 10, wherein a specific value is derived based on the binarization parameter for the TB binarization process, and
wherein the specific value is the number of values of the remaining intra prediction mode information binarized with a binarization value of k bits, and
wherein when the binarization parameter for the TB binarization process is 60, the k bits is derived as 5 bits.

12. The image encoding method of claim 11, wherein the specific value and the k are derived based on Equation below, $$n = C\text{Max} + 1$$
$$k = \text{Floor}(\text{Log2}(n)) \text{ so that } 2^k <= n < 2^{k+1}$$
$$u = 2^{k+1} - n$$

wherein, c Max represents the binarization parameter, and u represents the specific value.

13. A non-transitory computer-readable storage medium storing a bitstream generated by a method, the method comprising:
deriving neighboring samples of the current block;
deriving most probable mode (MPM) list including MPM candidates of the current block;
rearranging remaining intra prediction modes excluding the MPM candidates based on a pre-configured order;
determining an intra prediction mode of the current block based on the rearranged remaining intra prediction modes, wherein the intra prediction mode is one of the rearranged remaining intra prediction modes;
deriving a prediction sample of the current block based on the intra prediction mode and the neighboring samples;
deriving a residual sample of the current block based on the prediction sample;
encoding image information including remaining intra prediction mode information and residual information for the current block; and
generating the bitstream including the image information,
wherein the remaining intra prediction mode information represents the intra prediction mode of the current block,
wherein the remaining intra prediction mode information is bypass coded based on a truncated binary (TB) binarization process, and
wherein a binarization parameter for the TB binarization process is 60,
wherein the remaining intra prediction mode information equal to one of 0 to 2 is binarized with a binarization value of 5 bits, and
wherein the remaining intra prediction mode information equal to one of 3 to 60 is binarized with a binarization value of 6 bits,
based on a value of the remaining intra prediction mode information being N, the remaining intra prediction mode information indicates an N+1th intra prediction mode among the rearranged remaining intra prediction modes as the intra prediction mode of the current block, and the pre-configured order is as below:
{0, 1, 50, 18, 49, 10, 12, 19, 11, 34, 2, 17, 54, 33, 46, 51, 35, 15, 13, 45, 22, 14, 66, 21, 47, 48, 23, 53, 58, 16, 42, 20, 24, 44, 26, 43, 55, 52, 37, 29, 39, 41, 25, 9, 38, 56, 30, 36, 32, 28, 62, 27, 40, 8, 3, 7, 57, 6, 31, 4, 65, 64, 5, 59, 60, 61, 63}.

\* \* \* \* \*